United States Patent
Hanson et al.

(10) Patent No.: US 9,429,463 B2
(45) Date of Patent: Aug. 30, 2016

(54) SYSTEM AND METHOD FOR MEASURING MOVING VEHICLE INFORMATION USING ELECTRICAL TIME DOMAIN REFLECTOMETRY

(71) Applicant: INTERNATIONAL ROAD DYNAMICS, INC., Saskatoon, Saskatchewan (CA)

(72) Inventors: Randal Leroy Hanson, Saskatoon (CA); Michael David Lockerbie, Saskatoon (CA); Ian Robert Meier, Saskatoon (CA); Tyler William Haichert, Saskatoon (CA)

(73) Assignee: International Road Dynamics, Inc. (CA)

( * ) Notice: Subject to any disclaimer, the term of this patent is extended or adjusted under 35 U.S.C. 154(b) by 0 days.

(21) Appl. No.: 13/835,797

(22) Filed: Mar. 15, 2013

(65) Prior Publication Data

US 2014/0249711 A1    Sep. 4, 2014

Related U.S. Application Data

(60) Provisional application No. 61/772,138, filed on Mar. 4, 2013.

(51) Int. Cl.
  *G01G 19/02* (2006.01)
  *G07C 5/08* (2006.01)
(52) U.S. Cl.
  CPC ............... *G01G 19/024* (2013.01); *G07C 5/08* (2013.01)
(58) Field of Classification Search
  USPC ........................................................ 701/124
  See application file for complete search history.

(56) References Cited

U.S. PATENT DOCUMENTS 4,560,016 A    12/1985 Ibanez et al.
4,712,423 A    12/1987 Siffert et al.
(Continued)

FOREIGN PATENT DOCUMENTS

CA    2163045    5/1997
CN    202209955    5/2012
(Continued)

OTHER PUBLICATIONS

Ki-Seok Kwak, Tae Sung Yoon and Jin Bae Park, Load Impedance Measurement on a Coaxial Cable via Time-Frequency Domain Reflectometry, SICE-ICAS International Joint Conference, Oct. 18-21, 2006 in Bexco, Busan, Korea, pp. 1643-1646.*

(Continued)

*Primary Examiner* — Thomas G Black
*Assistant Examiner* — Ana Thomas
(74) *Attorney, Agent, or Firm* — Tarolli, Sundheim, Covell & Tummino LLP

(57) ABSTRACT

Systems, apparatus and methods are provided for measuring moving vehicle information. Moving vehicle information may be measured by a sensor configured to respond to one or more wheels of the vehicle, where one or more of the wheels changes the characteristic impedance of the sensor at the wheel's contact location. An electrical time domain reflectometry signal processing system which is capable of measuring the change in the impedance of the sensor and converting the impedance change to a signal may be connected operatively to the sensor. A data-processing system receives the signal and extracts the vehicle information therefrom.

42 Claims, 15 Drawing Sheets

(56) References Cited

U.S. PATENT DOCUMENTS

| | | | |
|---|---|---|---|
| 4,799,381 A | 1/1989 | Tromp | |
| 5,111,897 A | 5/1992 | Snyder et al. | |
| 5,260,520 A | 11/1993 | Muhs et al. | |
| 5,448,222 A * | 9/1995 | Harman | G08B 13/2497 340/566 |
| 5,585,604 A * | 12/1996 | Holm | G01G 19/035 177/1 |
| 5,693,886 A | 12/1997 | Seimiya et al. | |
| 5,705,984 A | 1/1998 | Wilson | |
| 5,710,558 A | 1/1998 | Gibson | |
| 5,900,592 A | 5/1999 | Sohns et al. | |
| 5,998,741 A * | 12/1999 | Beshears | G08G 1/015 177/133 |
| 6,459,050 B1 | 10/2002 | Muhs et al. | |
| 6,692,567 B1 | 2/2004 | Tatom et al. | |
| 6,865,518 B2 | 3/2005 | Bertrand et al. | |
| 6,894,233 B2 * | 5/2005 | Dingwall | G07B 15/00 177/210 C |
| 7,072,763 B2 * | 7/2006 | Saxon | G01G 19/086 177/136 |
| 7,375,293 B2 * | 5/2008 | Beshears | G01G 23/3735 177/133 |
| 7,421,910 B2 | 9/2008 | Chen et al. | |
| 7,783,450 B2 | 8/2010 | Hively et al. | |
| 2004/0080432 A1 | 4/2004 | Hill et al. | |
| 2004/0239616 A1 | 12/2004 | Collins | |
| 2005/0082094 A1 | 4/2005 | Gebert | |
| 2005/0271474 A1 | 12/2005 | Smith et al. | |
| 2006/0052980 A1 | 3/2006 | LaFollette et al. | |
| 2006/0097730 A1 * | 5/2006 | Park | G01R 31/088 324/534 |
| 2007/0067141 A1 | 3/2007 | Beshears et al. | |
| 2008/0136625 A1 | 6/2008 | Chew | |
| 2009/0151421 A1 | 6/2009 | Susor | |
| 2009/0273352 A1 | 11/2009 | Yu | |
| 2011/0015808 A1 | 1/2011 | Dreier et al. | |
| 2011/0037483 A1 | 2/2011 | Scheuermann et al. | |
| 2011/0127090 A1 | 6/2011 | Vijayaraghavan et al. | |
| 2011/0267200 A1 | 11/2011 | Reynolds et al. | |
| 2014/0249711 A1 | 9/2014 | Hanson et al. | |
| 2014/0291039 A1 * | 10/2014 | Hanson | G01G 19/024 177/1 |
| 2016/0018252 A1 * | 1/2016 | Hanson | G01G 19/024 73/774 |
| 2016/0019731 A1 * | 1/2016 | Hanson | G01G 19/024 701/29.1 |

FOREIGN PATENT DOCUMENTS

| | | |
|---|---|---|
| EP | 0423440 | 4/1991 |
| EP | 0491655 | 6/1992 |
| EP | 0997713 | 5/2000 |
| EP | 2189766 | 5/2010 |
| FR | 2857092 | 1/2005 |
| GB | 225081 | 6/1992 |
| GB | 2250813 | 6/1992 |
| GB | 2377027 | 12/2012 |
| JP | 2008232954 | 10/2008 |
| JP | 2012-42219 | 3/2012 |
| WO | 2006/129999 | 12/2006 |
| WO | 2013071452 | 5/2013 |
| WO | 2014136066 | 9/2014 |

OTHER PUBLICATIONS

C I Merzbacher, A D Kersey, and E J Friebele. Fiber optic sensors in concrete structures: a review, 1996 Smart Mater. Struct. 5. pp. 196-208.*

Mark W Lin, Jagan Thaduri and Ayo O Abatan. Development of an electrical time domain reflectomery (ETDR) distributed strain sensor. Jun. 15, 2005. Institute of Physics Publishing. Meas. Sci. Technol. 16 (2005) 1495-1505.*

Tong et al, Study on Elastic Helical TDR Sensing Cable for Distributed Deformation Detection, *Sensors* 2012, 12, 9586-9602, ISSN 1424-8220.

Shin et al, "Evaluation of the Load Impedance in Coaxial Cable via Time-Frequency Domain Reflectometry", *Advanced Signal Processing Algorithms, Architectures, and Implementations XIII*, Proceedings of SPIE, vol. 5205 (2003).

Shin et al, "Time-Frequency Domain Reflectometry for Smart Wiring Systems", *Advanced Signal Processing Algorithms, Architectures, and Implementations XIII*, Proceedings of SPIE, vol. 4791 (2002).

Kwak et al; "Load Impedance Measurement on a Coaxial Cable via Time-Frequency Domain Reflectometry", *SICE-ICASE International Joint Conference* Oct. 18-21, 2006, Bexco, Busan, Korea.

Paulter, "An Assessment on the Accuracy of Time-Domain Reflectometry for Measuring the Characteristic Impedance of Transmission Lines", *IEEE Transactions on Instrumentation and Measurement*, vol. 50, No. 5, pp. 1381-1388, Oct. 2001.

CIPO Examination Notes, PCT/IB2014/059406 (Jun. 2014).

PCT Written Opinion of the International Searching Authority, Jul. 2, 2014.

PCT Int'l Search Report, PCT/IB2014/059406 (Jun. 2014).

PCT/IB2014/059434 Notification of Transmittal of International Preliminary Report on Patentability, date of mailing Jun. 25, 2015.

"Development of an Electrical Time Domain Reflectometry (ETDR) Distributed Strain Sensor", Mark W. Lin, Jagan Thaduri and Ayo A. Abatan, Institute of Physics Publishing, Measurement Science Technology 16 (2005), pp. 1495-1505, Published Jun. 15. 2005.

Page 7 of Office Action mailed Oct. 27, 2015 for U.S. Appl. No. 14/196,765 which has footnote 1 which details "What is Coaxial Cable?" definition from WhatIS.com website (http://searchdatacenter.techtarget.com/definition/coaxial-cable).

PCT/IB2014/059434 Written Opinion of the International Searching Authority, completed Jun. 25, 2014.

PCT/IB2014/059434 International Search Report, completed Jun. 25, 2014.

"Vehicle Weighing In Motion With Fibre Optic Sensors" J Boby, S Teral, J M Caussignac & M Siffert, Measurement & Control vol. 26, Mar. 1993, pp. 45-47.

* cited by examiner

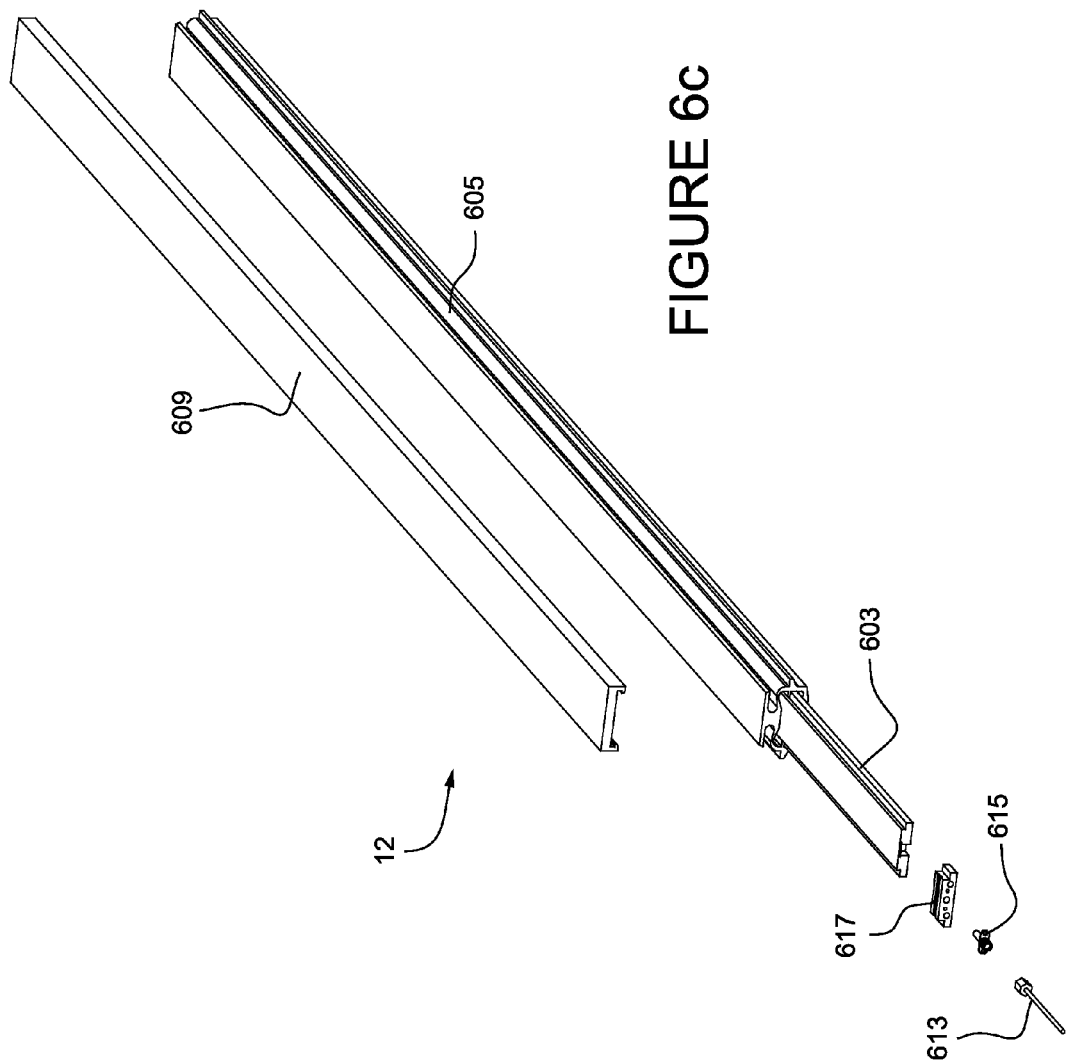

SYSTEM AND METHOD FOR MEASURING MOVING VEHICLE INFORMATION USING ELECTRICAL TIME DOMAIN REFLECTOMETRY

CROSS-REFERENCE TO RELATED APPLICATION

This application is related to and claims domestic priority benefits under 35 USC §119(e) from U.S. Provisional Patent Application Ser. No. 61/772,138 filed on Mar. 4, 2013, the entire content of which is expressly incorporated hereinto by reference.

FIELD

The embodiments disclosed herein relate generally to intelligent transportation systems.

BACKGROUND

Intelligent transportation systems may involve data collection, toll collection, vehicle classification, weigh in motion (WIM), and other traffic monitoring or traffic management systems.

For example, WIM systems are used to detect and weigh vehicles in motion in order to enhance the operation of road systems in a safer and more efficient manner.

A WIM system uses one or more sensors to obtain information about a vehicle as it is sensed by the sensor, typically as the vehicle moves over the sensor. Some information may be measured directly from a sensor, and other information may be measured and derived from a combination of sensors operating together.

Vehicle information that may be measured includes, for example, the number of axles, weight per axle, weight per wheel, vehicle weight, wheel count, wheel spacing, axle spacing, axle width, and axle and/or vehicle speed. Aggregate information may also be collected such as the total number of vehicles detected by the sensors.

Time Domain Reflectometry

Generally, time domain reflectometry (TDR) is a measurement technique based on the principle that a transmission-line of a particular geometry presents a known characteristic impedance. Therefore, changes to the geometry of the transmission-line result in changes in the characteristic impedance that can be measured using TDR techniques. A skilled person would understand that time domain reflectometry may be used with optical or electrical signals, and that practically the optical and electrical signals are physically different requiring differently skilled knowledge and equipment to measure changes in transmission line characteristics.

In an electrical transmission-line, a reflection will be generated whenever an incident wave meets a change in the characteristic impedance, which is also known as a discontinuity. TDR measurement techniques can then be used to determine the location and magnitude of the discontinuity in the transmission-line from the reflected wave. Thus, the time the reflected wave takes to travel back along the transmission-line can be translated into a distance along the transmission-line. The magnitude of the voltage of the reflected wave can be used to calculate the amount of change in the characteristic impedance.

TDR measurement techniques may use a step input voltage for the incident wave shape as it eases the complexity of interpreting the reflected signals. In source- or both-ends terminated transmission lines, the step input voltage is divided between the source impedance and transmission-line impedance. If the source and transmission-line impedances are matched, then the voltage measured between the source and transmission-line over the round-trip of the incident wave along the transmission-line is half of the step input voltage. Where discontinuities exist on the transmission-line, the voltage measured will deviate from exactly half due to the received reflections. Other approaches for TDR measurement may also be used, such as wave modulation with a swept frequency.

UK patent application GB 2,250,813A discloses a weighing apparatus for vehicles. The apparatus comprises a fibre optic cable whose light transmission characteristics vary under load and is encased in a pressure pad of resilient material and laid across a roadway. As a vehicle crosses the pressure pad, a time domain reflectometer calculates the load exerted by each wheel by monitoring the intensity of back scattered light from the fibre optic cable.

Known traffic monitoring and transportation management systems typically use strain gauge type sensors, for example, a mechanical strain gauge or piezo electric strain sensor, that are not configured as a transmission line. Therefore, existing intelligent transportation systems using strain gauge type sensors have signal processing systems and digital processing systems that do not utilize electrical TDR (ETDR) measurement techniques.

SUMMARY

Existing intelligent transportation systems may be improved by increasing the fidelity of the measured or extracted information corresponding to the physical property of the vehicle being measured by the sensor, e.g. information about the vehicle's wheel weights, as the vehicle's wheels move over the sensor. Existing intelligent transportation systems may also be improved by adding the ability to measure additional wheel specific parameters.

Being able to accurately measure the magnitude of the wheel load on the sensor is a separate technical problem from being able to accurately determine the number of wheels, and/or where the wheel load or loads are applied on the sensor.

An object of the present invention is to provide a system for measuring moving vehicle information. In accordance with one aspect of the invention there is provided a system for measuring moving vehicle information comprising: a sensor configured to respond to one or more wheels of the vehicle, where one or more of said wheels changes the characteristic impedance of the sensor at the wheel's contact location; an electrical time domain reflectometry signal processing system capable of measuring the change in the impedance of the sensor and converting the impedance change to a signal; and a data-processing system capable of extracting vehicle information from the signal.

The system is configured to measure moving vehicle information, comprising number of wheels per axle, wheel pressure and wheel-road contact dimensions which include wheel width, wheel location on the sensor and the length of time the wheel exerts force on the sensor as measured using electrical time domain reflectometry (ETDR).

In another aspect of the invention there is provided an apparatus for measuring information about a moving vehicle comprising a sensor whose impedance changes in response to an applied load; a signal source for transmitting an electrical signal along the sensor; a receiver for measuring a reflected electrical signal reflected by the sensor, the reflected electrical signal caused by the impedance change of the sensor; and a data processing system for extracting information about the vehicle from the reflected electrical signal.

In various embodiments of the system and apparatus, the sensor comprises a transmission line that is integrated transversely into a roadway so that traffic, i.e. vehicles, pass over the sensor. The force exerted on the sensor, due to the weight of the passing wheel of the vehicle, causes a deflection in the structure of the transmission line, thereby affecting the impedance of the transmission line where the force is applied. The impedance change is measured using ETDR techniques, and the vehicle information is extracted from the measured impedance changes using signal processing systems and digital processing systems.

In one embodiment, the sensor comprising a transmission line may be calibrated at every position along the line in order to improve accuracy.

In another embodiment, the sensor is protected by encasing it in a resilient and durable housing.

In a further embodiment, the sensor may be positioned above the road. In an alternative embodiment, the sensor may be positioned flush with the road surface. In another alternative embodiment, the sensor may be positioned below the road surface.

The sensor in one embodiment is generally transversely oriented relative to the movement of the vehicles, spanning the width of the road. In an alternative embodiment the sensor spans one lane of the road. A skilled person would understand, however, that different sensor orientations, placements, and lengths are possible.

In another aspect of the invention there is provided a method for measuring moving vehicle information using time domain reflectometry. In one embodiment of the invention the method comprises measuring the change in the impedance of a sensor using electrical time domain reflectometry signal processing; converting the impedance change to a signal; and processing the signal to extract vehicle information.

In various aspects and embodiments of the invention, the use of ETDR to measure moving vehicle information provides additional data compared to known intelligent transportation systems, and more reliable information over prior known vehicle information systems. In another embodiment, the use of ETDR to measure moving vehicle information may be more cost effective over known systems.

In one embodiment of the invention, the use of ETDR to measure moving vehicle information allows for the collection of detailed vehicle information, including spatial data, using a single ETDR sensor. This includes spatial data that is not reasonably obtainable in a cost effective manner using known systems.

In another embodiment, the weight of the vehicle can be calculated by integrating the wheel pressure associated with the instantaneous wheel-sensor contact duration measured using the ETDR techniques over the wheel-road contact length. The wheel-road contact length is determined by the speed of the vehicle, specifically the speed of the wheels of the vehicle as they move over the ETDR sensor and wheel-sensor contact duration. The weight of the vehicle is then calculated as the sum of the weight calculated for each wheel of the vehicle. The weight of each axle is calculated as the sum of the weight for each wheel associated with that axle.

A skilled person would understand that generally a vehicle travelling on a road has wheels, that the wheels are travelling at the same speed as the vehicle, and, that the wheels are practically synonymous with the tires. A skilled person would also understand that vehicle speed may be determined in a variety of ways. In one embodiment of the invention, vehicle speed may be calculated by separating two sensors by a known distance, then calculating the vehicle speed by measuring the time it takes the vehicle to travel the fixed distance between the two sensors. The sensors could be two ETDR sensors, or other known sensors such as loop sensors, mechanical strain gauges, or piezoelectric sensors, or a combination of different sensor types. Vehicle speed may also be measured by radar or other known techniques.

In one embodiment, the measurement of moving vehicle information comprises one or more ETDR sensors that may be used in combination with other non-ETDR sensors such as temperature sensors, speed sensors, loop or vehicle presence sensors, accelerometer sensors, seismic sensors, acoustic sensors, or any other sensor suitable for collecting relevant road condition, road environment, or vehicle information.

In various aspects and embodiments of the invention, the vehicle information and/or data collected by the apparatus, system or method may be stored in a data store. In one embodiment, information of various forms (e.g. data) may be made available over a network such as a virtual private network (VPN) or the internet. In another embodiment of the invention, the data store may be a hard drive or solid state drive, or other known storage technology. In yet another embodiment, the data store may have a physical interface whereby a user may collect the information and/or data, e.g. serial port, parallel port, ethernet port, usb port, or other known computer interface.

A skilled person would understand that the information may be in a raw or processed form, or that information in the form of data may be metadata, or other data generated by the system, apparatus or method that is related to the operation of the system, apparatus or method for measuring moving vehicle information, and not limited to vehicle information alone, including the interaction of the roadway with the vehicle.

BRIEF DESCRIPTION OF THE FIGURES

FIGS. 6a-6c are respectively top view, sectional view, and perspective view along the line A-A of an example embodiment of a ETDR sensor.

DETAILED DESCRIPTION

The various aspects and embodiments of the invention will now be described with reference to the figures.

Exemplary System and Operation

Figure 1A:
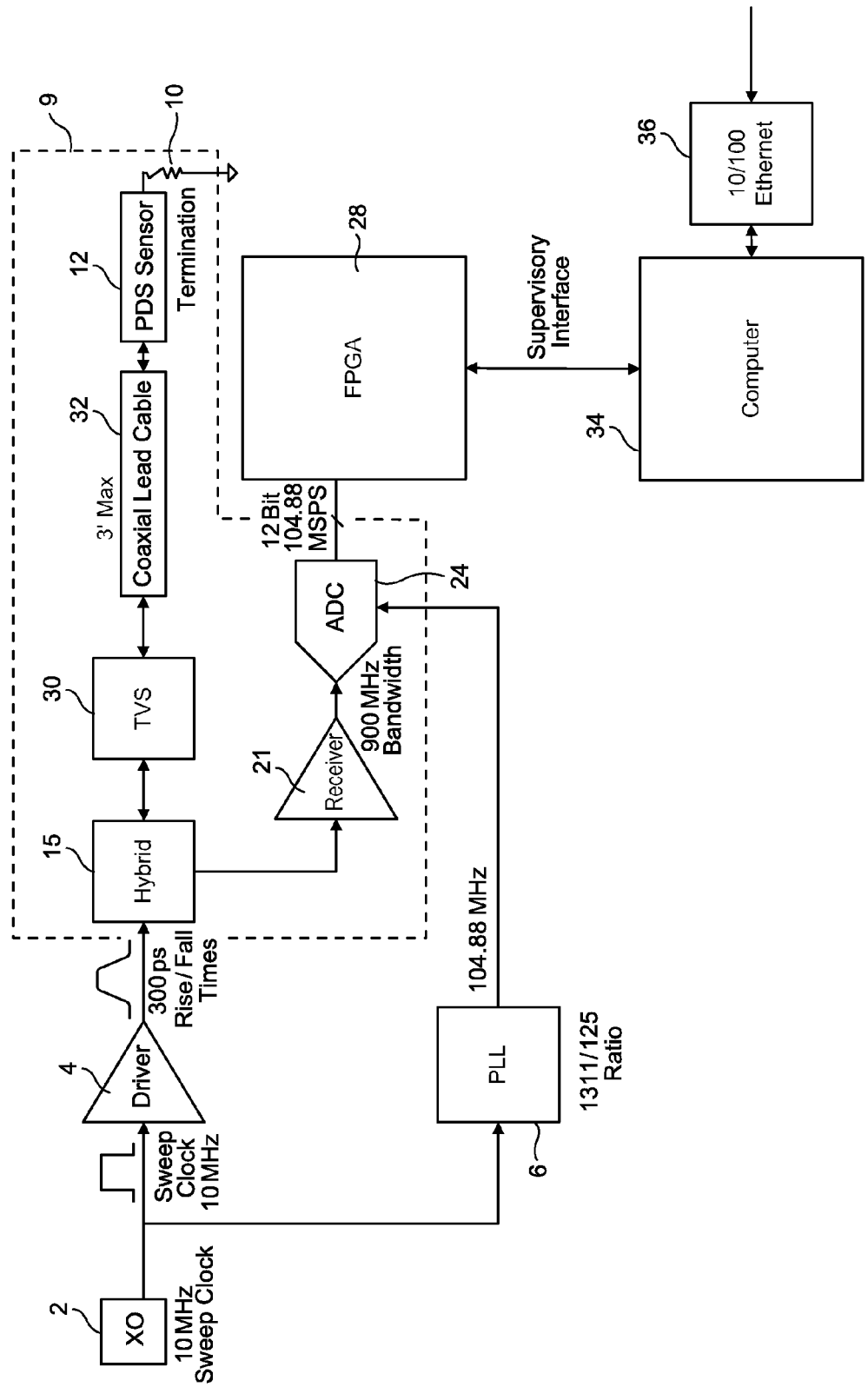
FIG. 1a is a system block diagram of an example embodiment system for measuring vehicle information.

Referring now to FIG. 1a, there is shown an embodiment of the system and apparatus for measuring moving vehicle information. This embodiment may measure information about the moving vehicle such as the number of wheels per axle, wheel pressure and wheel-road contact dimensions including wheel width, wheel location on the sensor and the length of time the wheel exerts force on the sensor. From the vehicle information obtained, lane position can be determined. Vehicle speed, vehicle length, and vehicle count, may be measured using this embodiment in conjunction with additional sensors.

In the operation of this embodiment of the system and apparatus as shown in FIG. 1a, the crystal oscillator 2 generates a sweep clock signal that is buffered by a high-bandwidth driver 4. The signal is driven through a hybrid circuit 15 to the transmission line, which may consist of the coaxial lead cable 32, printed circuit board (PCB) trace (not shown), and parametric disturbance sensor (PDS) 12. The components of the system in the bandwidth sensitive area 9 must be able to pass high frequencies in order to reproduce the spatial features of the load 11.

Parametric Disturbance Sensor (PDS)

A skilled person would understand that the PDS 12 is the portion of the transmission line that is, in an embodiment, located transversely, embedded within, and flush with the surface of the roadway. The skilled person would also appreciate that the signal would travel along the entire transmission line and that the entire transmission line may be considered as the entire sensor in other embodiments. A description of an exemplary PDS construction for use with the system and apparatus of the invention is provided under the section entitled, "Sensor" of the detailed description.

The PDS 12 is constructed so as to be capable of changing impedance in a predictable manner. In an embodiment of the invention, the PDS is configured to produce detectable changes in impedance for vehicles with tire pressures ranging from 10 pounds per square inch (PSI) to 150 PSI. In another embodiment, the PDS is configured to allow for a detectable transverse spatial resolution of 1.5 inches, which is obtained, in cooperation with the capabilities of the electronics interface. The PDS is attached to an appropriate terminator 10 for minimizing reflections, which is a termination resistor that closely matches the characteristic impedance of the PDS, e.g. a 1% 50 ohm resistor.

Electrical Time Domain Reflectrometry Signal Processing System

Any impedance mismatches along the transmission line such as those produced by a wheel load results in reflections that travel back towards the source of the signal in the transmission line. The hybrid circuit 15 directs these reflections to the receiver 21, where they are amplified, and then digitized by the analog to digital converter 24. The converted and sampled data is processed by the field programmable gate array (FPGA) 28. Then, the data as processed by the FPGA is further processed by the computer 34 to obtain the desired information about the vehicle.

The sweep clock period is chosen so that the half period is larger than the round-trip time of the wave traversing the PDS. The following equation calculates the maximum sweep clock frequency at which the device and system can operate:

$$\text{Frequency\_max} = 1/\text{Time\_min};$$

In one embodiment of the system and apparatus of the invention, the total transmission line delay may comprise the PDS 12 delay, the lead cable 32 delay, and the PCB trace delay. Therefore $T\_min = 4 \times (D\_PDS + D\_lead + D\_trace)$. In another embodiment, $T\_min$ may be as small as just $4 \times (D\_PDS)$, independent of lead cable and trace length. Then, multiple edges would exist within the entire transmission line at any instance in time, however, no more than one edge would be within the PDS 12 itself. The signal witnessed at the receiver 21 would consist of the superposition of multiple reflections, but reflections from the lead cable and PCB trace are constant and may be baseline subtracted leaving only the reflection from the PDS 12. Therefore, $\text{Time\_min} = 4 \, (\text{Delay\_PDS})$.

In yet another embodiment of the invention, the crystal oscillator 2 generates a 10 megahertz (MHz) reference clock signal. The driver 4 is used to buffer the clock signal, and to produce a high edge-rate signal, e.g. a low-voltage positive emitter-coupled logic (LVPECL) with 300 picosecond rise/fall times. This high-edge rate signal is driven into the hybrid circuit 15 and transmission line.

The hybrid circuit 15, is used to couple the transmitted and received signals to and from the transmission line. The sweep clock signal travels from the driver 4 to the termination 10 at the end of the sensor 12, and the reflected signals travel from the source of the impedance mismatch in the transmission line, preferably in the sensor 12, to the receiver 21. The hybrid circuit 15 allows the receiver 21 to see the reflected signals without seeing the transmitted signal. The basic function of the hybrid circuit 15 is that it subtracts the transmit signal from the composite signal containing both the transmitted and received signals, yielding only the received signal. Additionally, the received signal is amplified, in an embodiment, by a gain of 10.

In an embodiment of the invention, transient voltage suppression (TVS) 30 protection circuitry may be used to protect the apparatus or system hardware from electrostatic discharge (ESD) or lightning-induced surges. When the protection circuitry has sufficiently low capacitance it does not appreciably affect the bandwidth of the apparatus or system.

The lead cable 32 is for connecting the hybrid circuit to the PDS 12. In an embodiment, the lead cable is under 3 feet long with a characteristic impedance of 50 ohms, but a skilled person would understand that choosing a different lead cable length or characteristic impedance is possible.

The function of receiver amplifier 21 is to amplify the received signal from the hybrid circuit 15 and to drive the amplified differential signal into the analog to digital converter (ADC) 24. In an embodiment, a fully differential amplifier with an amplification factor of 4 may be used. A skilled person would understand that different amplifier designs may be used.

ADC 24 is for digitizing the signal from the receiver amplifier 21. Also, the ADC 24 receives a sampling clock signal from the PLL 6. The digital output, representing the sampled version of the signal from the receiver, of the ADC 24 is connected to the FPGA 28. In an embodiment, the ADC has 12 bits of resolution with 104.88 mega samples per second (MSPS).

The phase lock loop (PLL) 6 is for generating a sampling clock that allows the use of equivalent time sampling technique. Equivalent time sampling is a known technique that allows for an effective sampling rate much higher than the actual sampling rate.

In an embodiment, the PLL is used to lock the 104.88 MHz sampling clock to the 10 MHz sweep clock. This ratio is 1311/125, and is chosen so that the ADC samples the reflected signal at 1311 evenly spaced positions after 125 cycles of the sweep clock. Therefore, in this embodiment, with these parameters, a skilled person would understand that a practical sensor length of 13 feet with the lead cable length being 3 feet of RG-58 is appropriate. A skilled person would also understand that different sensors lengths or lead cable lengths may be used under different sampling conditions.

Data Processing System

The FPGA 28 is for receiving and processing the ETDR data from the ADC 24, and sending it to the computer 34. The computer 34 cooperates with the FPGA 28 to process the digitized and FPGA processed signal data. In an embodiment, the computer 34 aggregates individual wheel events received from the FPGA 28 into vehicle records containing numerous pieces of vehicle profile information. In an embodiment, the computer 34 is a computer on module. A skilled person would understand that there are other equivalent computing or embedded computing solutions that may be used instead. In an embodiment, these processing steps may include, ADC sample receiving, sample reordering, sweep averaging, sweep zone integration, and positional monitoring.

In an embodiment, a zone refers to a range of samples associated with positions located transversely along the length of the PDS 12 that is experiencing a load, or disturbance, from a wheel or wheels. For example, a car crossing the PDS would create 2 zones per axle, i.e. one zone for the left tire and one zone for the right tire for each axle. Each zone is a number of sample positions wide centered on the wheel. Those sample position's values are then integrated over the wheel-sensor contact duration producing a raw tire weight. Then, with the speed of the vehicle or the speed of the wheel, the absolute weight of the wheel in each zone can be calculated, that is the raw weight of the wheel multiplied or integrated by the speed. The average pressure for each wheel is then calculated based on the approximate wheel-sensor or wheel-road contact patch area. To calculate the absolute weight of the wheel, it is more accurate to use the speed of the wheel instead of the speed of the vehicle, as the vehicle may be changing speed, e.g. slowing or speeding up. The absolute weight of the vehicle is then calculated from the raw weight of the vehicle, which is the sum of the raw wheel weights and then integrated or multiplied by the speed of the vehicle, or, the absolute weights of the wheels added together.

In an embodiment, digital samples are clocked into the FPGA 28 at 104.88 mega samples per second (MSPS), corresponding to the ADC 24 sample rate. Due to the equivalent time sampling technique used to collect the 1311 evenly spaced reflections, the samples will arrive at the FPGA 28 out of sequence. To reorder the samples, they are placed into internal memory locations of the FPGA 28 using an address pointer that increments by 125 modulo 1311. A full set of 1311 consecutive samples constitutes a sweep. An external presence detection device or vehicle presence sensor, e.g. an inductive loop sensor, light curtain, microwave sensor or acoustic sensors, is used to ensure wheels are absent from the PDS 12. When wheels are absent, one or more sweeps may be averaged to assemble a baseline sweep or control sweep. The baseline sweep is regenerated frequently to ensure it accurately represents the current properties of the undisturbed or unloaded PDS 12. Incoming sweeps are then compared against the baseline sweep and any significant difference detected form the basis of a disturbance. A disturbance zone is limited in width to either a single or multi-wheel array on a given side of a vehicle's axle. A zone thus contains only a subset of consecutive samples within a sweep, but may resize dynamically to accommodate variations in the disturbance width. Each zone is integrated over the width and duration of the disturbance. Once the disturbance exits the PDS 12, parameters such as start time, location, width, duration, and raw weight are stored to memory and an interrupt flag is set to signal the computer 34 that a new wheel event has occurred. Once the interrupt is detected by the computer 34, it may retrieve the wheel event data from the FPGA's 28 memory at a rate determined by the computer's 34 clock.

Figure 1B:
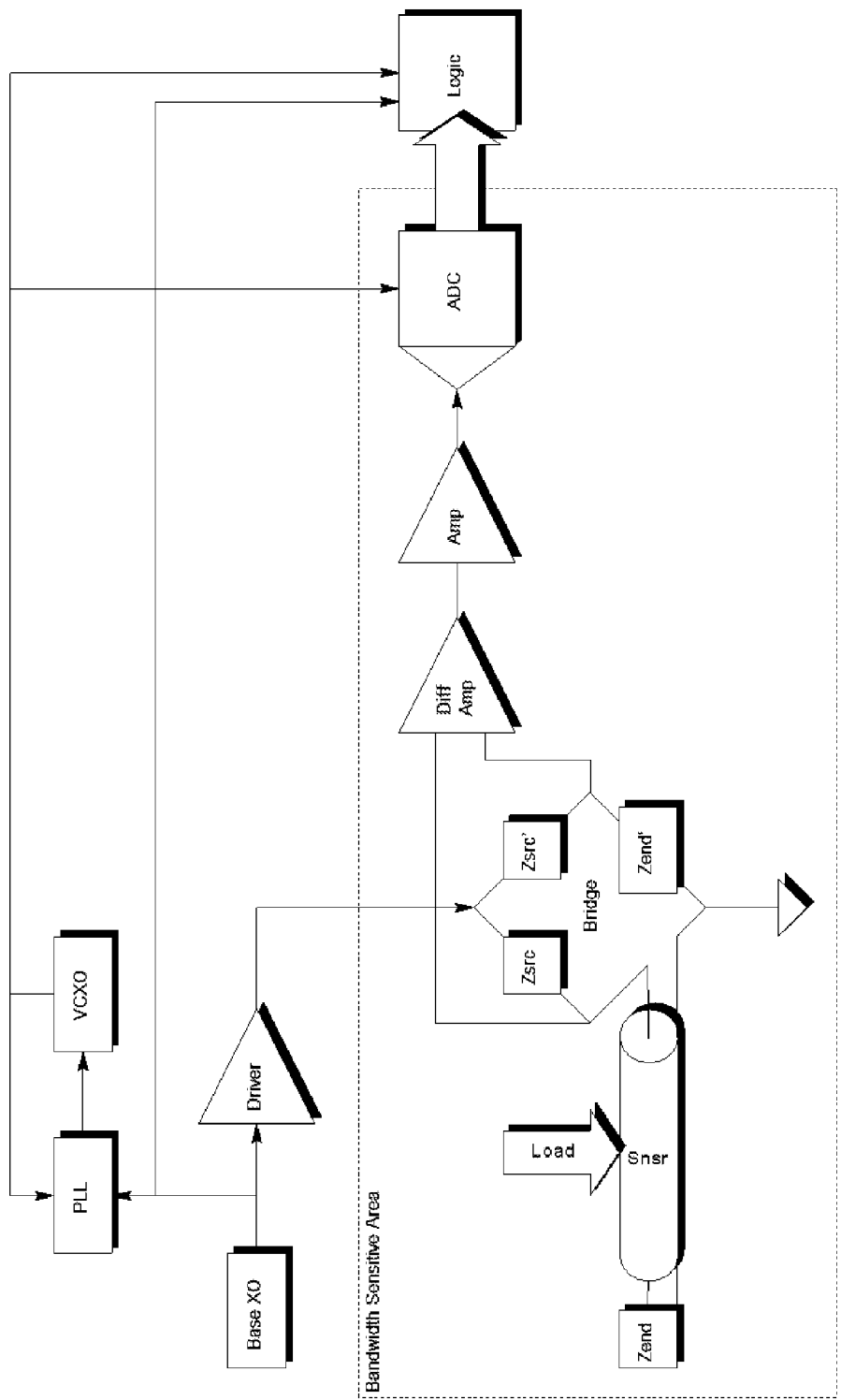
FIG. 1b is a system block diagram of an example embodiment system for measuring vehicle information.

System Configurations for Measuring Vehicle Parameters
Measuring Wheel Pressure and Wheel-Road (Sensor) Dimensions Referring now to FIG. 1b, there is shown another embodiment of the system and device for measuring moving vehicle information. This embodiment may measure information about the moving vehicle such as number of wheels per axle, wheel pressure and wheel-road contact dimensions including wheel width, wheel location on the sensor and the length of time the wheel exerts force on the sensor.

In this embodiment, base crystal oscillator 2 cooperates with a driver 4 to generate a step input incident signal at the base crystal oscillator 2 rate. The incident signal is driven into a sensor 12 through a bridge 15. A load 11 may be applied to the sensor 12, and the load 11 will generate a reflected signal along the sensor 12 that is sensed on the bridge 15. The differential reflected signal is transformed to a single-ended reflected signal by a differential amplifier 20 and then amplified by an amplifier 22. A skilled person would understand that a transformer may also be used instead of differential amplifier 20. An ADC 24 converts the analog reflected signal into digital reflected signal sample data that is fed into a logic 28. The logic 28 reassembles the reflected signal from the digital reflected signal sample data and performs calculations to calculate the magnitude of the load 11 or the location of the load 11 on the sensor 12 or both. Additionally, other vehicle information may be obtained by the logic 28.

As the load 11 contacts and traverses the sensor 12, the sensor 12 continuously reacts to the instantaneous load 11. The load 11 creates a change in the geometry of the sensor 12 and a corresponding measurable change in the characteristic impedance, which generates the reflected signal when the incident signal meets the discontinuity.

The sensor 12 is a transmission-line that is terminated at both ends. A source terminator 14 provides a voltage measurement point between the source terminator 14 and the sensor 12. End terminator 10 improves the signal to noise ratio by reducing extraneous end reflections of the incident signal that can pollute the reflected signal. Additionally, the sensor's 12 resistance and capacitance interact to produce a length dependent low pass filter that increases the rise and fall times of the reflected signal.

The relationship between the load 11 and the reflection coefficient of the sensor is preferably linear. This means that the changes in reflection coefficient or voltage deviations from nominal are a linear representation of the load 11 at the location the load 11 is applied to the sensor 12.

A skilled person will understand that the design and selection of the sensor 12 is varied, and will depend on the vehicle information to be measured by the system, device, or method. This includes making specific design decisions and trade-offs regarding cost, complexity, performance, and durability.

In an embodiment, the sensor 12 is embedded in the surface of a roadway transverse to a moving vehicle's direction of travel. A flat top portion of the sensor 12 could be raised slightly above the surface of the roadway to assure compression when the load 11 is present. Compression of the sensor 12 due to the load 11 will create changes in its geometry causing changes in the impedance that will generate the reflected signal in response to the step input incident wave.

For weigh-in-motion and vehicle detection, an embodiment of the PDS 12 is described below. In another embodiment, the sensor may be a compressible coaxial cable encapsulated in a jacket with a rectangular cross section. In another embodiment, for vehicle detection, the sensor may be two parallel conductors that form a twin-lead transmission line, where the proximity of the vehicle causes changes in the dielectric constant that may be measured as a change in the characteristic impedance using ETDR techniques.

The components of the system in the bandwidth sensitive area 9 must be able to pass high frequencies in order to reproduce the spatial features of the load 11. By defining the required resolution between spatial features, the step input incident signal rise time and bandwidth may be calculated:

time_rise=Length(transmission line feature spacing)/ 2*Velocity_propagation(propagation velocity of the medium)

BandWidth=0.35(single-pole constant of proportionality)/time_rise(10%-90% rise time)

The base crystal oscillator 2 generates the incident signal that is rising and falling with a fixed half-period that is longer than the round-trip time for the length of the sensor 12. The rise and fall times of the incident signal are calculated as above and are sufficiently fast to reveal the spatial resolution of the load 11 along the sensor 12. The longer the rise and fall times, the lower the incident signal's bandwidth, resulting in less resolution available from the reflected signal. Additionally, the base crystal oscillator 2 must have sufficiently low jitter and the signal chain bandwidth must be sufficiently high in order to maintain the spatial resolution of the spatial features of the load 11.

The driver 4 continuously drives the rising and falling incident signal from the base crystal oscillator 2 into the sensor 12 through the bridge 15. The 10%-90% rise and fall times of the driver 4 may be characterized based on the spatial feature resolution size. In an embodiment, to drive the incident signal with a feature spacing of 6-inches, the driver 4 should have corresponding 10%-90% rise and fall times of approximately 313 picoseconds:

10%-90% rise/fall time=0.1524 m (or 6 in)/[2*c (speed of light)*0.81(propagation velocity constant)]

10%-90% rise/fall time=313 picoseconds

Next, the bridge 15 is used to difference the reflected signal from the sensor 12, from that of a pair of fixed reference terminators consisting of a source terminator reference 16 and end terminator reference 18. The fixed reference terminators have nominally the same impedances as the sensor 12, source terminator 14 and end terminator 10. The bridge 15 highlights the deviations in the reflected signal from nominal values, resulting in a lower voltage dynamic range requirement of the ETDR signal processing means in the bandwidth sensitive area 9.

In an embodiment of the invention, the bridge 15 presents a common-mode voltage to the input of the differential amplifier 20. In another embodiment, the bridge 15 presents a common-mode voltage to the input of the transformer (not shown) of half of the driver 4 output voltage during the positive half-cycle of the incident signal, and zero elsewhere. The differential amplifier or transformer converts its input from a differential signal to a single ended signal by removing the common-mode signal and this further reduces the required voltage dynamic range of the ETDR signal processing means in the bandwidth sensitive area 9. A skilled person would understand that other methods of eliminating the input signal from a reflected signal could be used without departing from the scope of the present disclosure. The skilled person would understand that the signal observed at the inputs of the differential amplifier 20 consists of a) common-mode signal from the Driver 4, and b) differential-mode reflections from the sensor 12. The skilled person would also understand that it is ideal that the driver's 4 contribution to the signal is common-mode, however, practically there may be slight imbalances in the bridge Zsrc and Zend values that will introduce an additional differential-mode portion to the signal at the differential amplifier's 20 inputs. This imbalance is generally constant however and may be filtered by the logic or FPGA 28.

Then, the output of the difference amplifier 20 is fed into an amplifier 22 and amplified to meet the input range appropriate for the ADC 24. The ADC 24 converts the analog reflected signal into a digital version of the reflected signal at a sampling rate generated by the voltage controlled crystal oscillator 8. The ADC must support the sampling rate generated by the voltage controlled crystal oscillator 8 with an adequate bit resolution to reconstruct the load 11 with sufficient fidelity.

The voltage controlled crystal oscillator 8 cooperates with an anti-jitter circuit such as a phase lock loop (PLL) 6 to provide a sampling clock for the ADC 24 with sufficiently low jitter, which is required to maintain the spatial resolution of the sensed spatial features of the load 11.

The digital reflected signal samples are reassembled by the logic 28 and interleaved by using digital sampling oscilloscope techniques. In an embodiment, equivalent time sampling is used. Due to speed limitations of the ADC 24 and logic 28, sampling oscilloscope techniques are employed to capture the high frequency reflected signals that are experienced when capturing the required spatial feature resolution. For example, in an embodiment, the spatial feature resolution of 3 inches generates high frequency reflected signals that are experienced when differentiating the load 11 caused by a single wheel versus a dual wheel pair.

Additionally, the logic 28 can average many complete sweeps of the sensor in order to reduce the sensor measurement noise, and the reflected signal caused by the load 11 is differenced from a base-line signal from which the load 11 is known not to be present.

In an embodiment, when weighing a vehicle, for a load 11 caused by a wheel, the apparatus or system of the invention provides the force profile presented by the wheel-width over the time presented by the wheel length. The forces from these orthogonal axes are integrated by the logic 28 to yield the total wheel raw-weight presented. Then the raw-weight is multiplied by the wheel speed in the direction of travel to compensate for vehicles travelling at varying speeds to yield the actual wheel weight.

Figure 3:
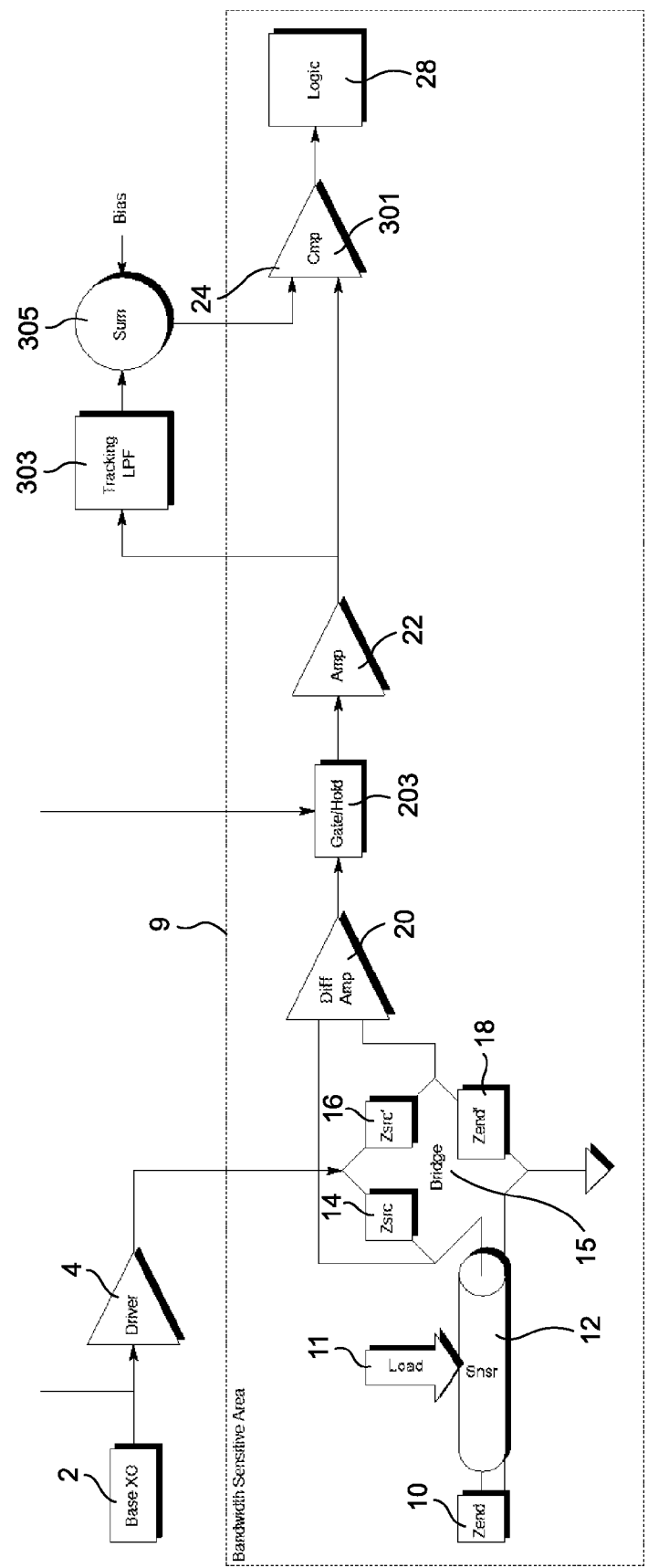
FIG. 3 is a system block diagram of an example embodiment system for determining wheel count.
Figure 4:
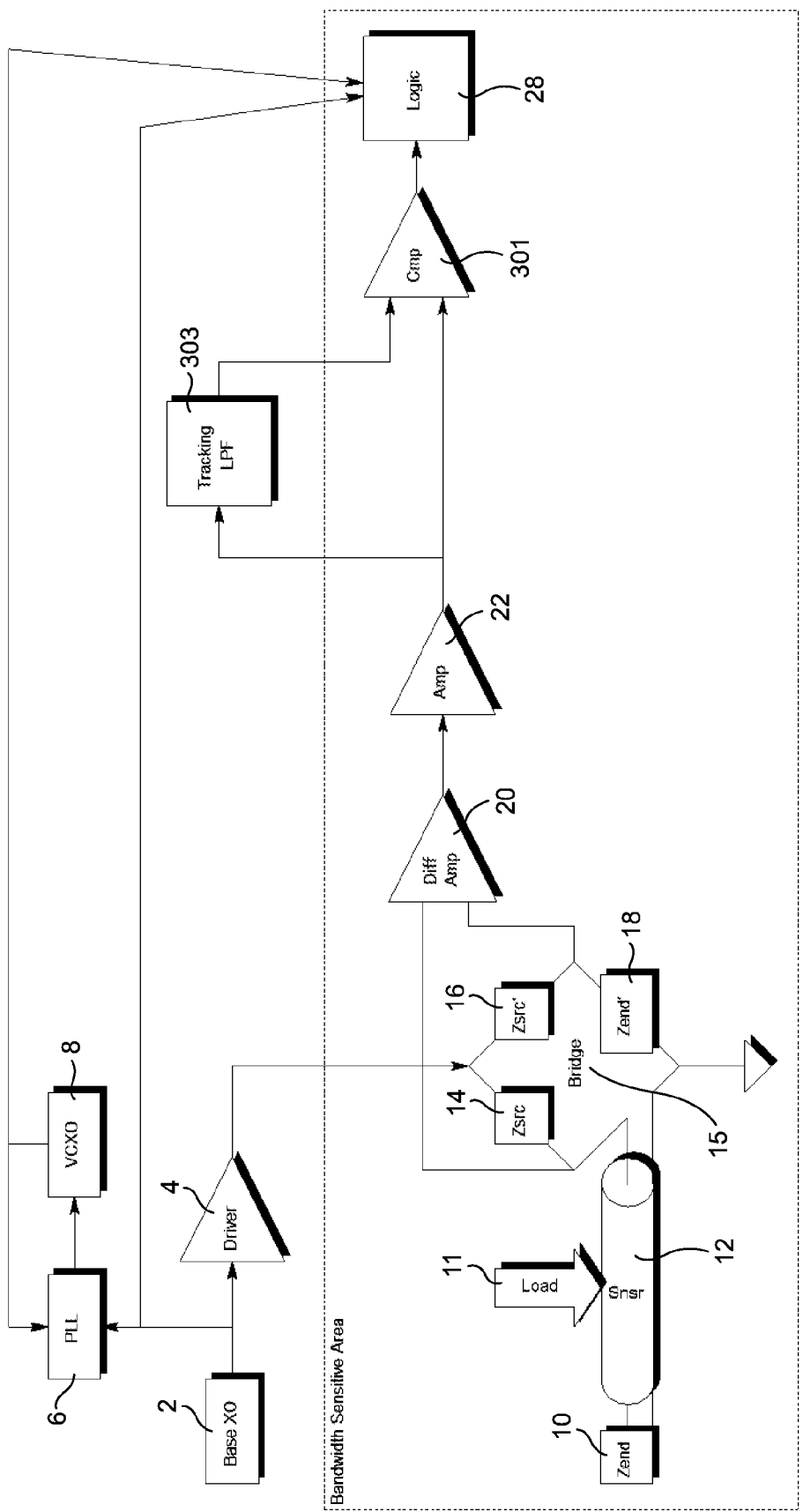
FIG. 4 is a system block diagram of an example embodiment system for determining the spatial profile of a vehicle.

In other embodiments of the invention, only a subset of vehicle data may be desired due to commercial reasons such as cost constraints or product differentiation. In these cases, the embodiments shown FIGS. 1a and 1b may be modified so that only the desired vehicle information is obtained or measured. These modifications may, in some embodiments, simplify the implementation of the system. Examples of these aspects and embodiments are shown in FIGS. 2 to 4.

Furthermore, in other exemplary embodiments of the apparatus and system as shown in FIGS. 1-4 may be used in combination with other non-ETDR sensors to collect road and vehicle information or data. For example, these sensors may be loop presence detectors, temperature sensors, speed sensors, strain gauge or piezoelectric strain sensors, or other sensors known in the art.

Detecting Weight and Axles of Vehicle

Figure 2:
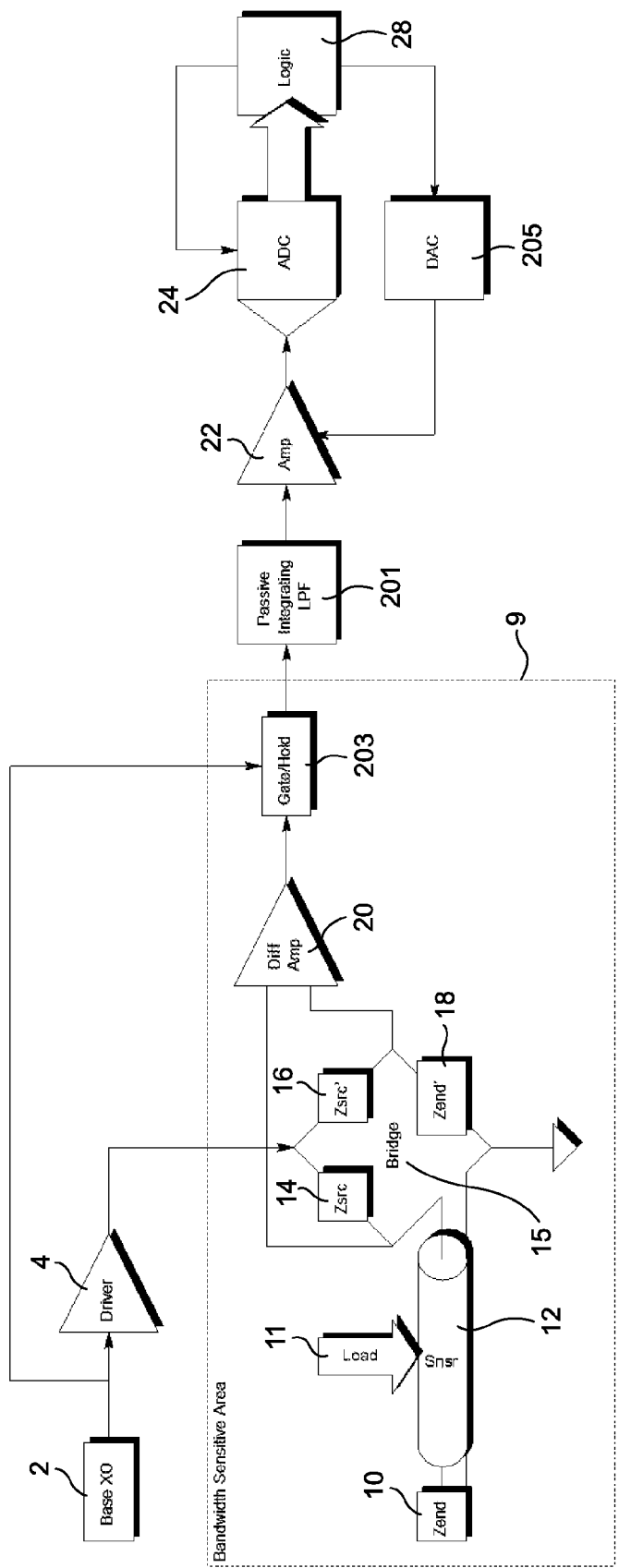
FIG. 2 is a system block diagram of an example embodiment system for determining axle and weight.

Referring now to FIG. 2, there is shown an embodiment of the invention directed towards determining the weight and detecting the axles of a vehicle. If only axle detection and weight information are of interest, system bandwidth can be reduced. This aspect reduces the cost of the device and system. This aspect also does not provide any spatial information along the length of the sensor, or transverse to the roadway, e.g. wheel width, wheel separation. It is still possible to determine spatial information that is longitudinal along the roadway, such as axle separation. Also, in this aspect, there is only a single calibration point for the entire sensor.

In the embodiment shown in FIG. 2, higher edge-rate and bandwidth are required to determine spatial information, in contrast to determining aggregate weight. As the driver edge-rate and bandwidth are reduced, the spatial signature is smeared. This makes it harder to determine spatial information. Note that as bandwidth is reduced, the smearing effect spreads the amplitude over a larger time (space), so that a higher resolution ADC 24 and lower noise floor may be required. Also, the ADC 24 will have a significantly reduced bandwidth and sampling rate requirements.

In the embodiment of FIG. 2, a passive analog integrating low-pass-filter (LPF) 201 is used to integrate all the weight information over the sensor and lead cable, followed by sampling the signal by the ADC 24 at the desired measurement interval. In an embodiment, the interval may be 250 microseconds. This measurement interval can be completely decoupled from the Base XO 2. The wheel weight signals are differenced from a base-line signal from which tires are known not to be present.

The driver 4 edge-rate may be reduced to the point where the rise and fall times approach Base XO 2 half period. This approach increases the complexity of the driver 4 circuitry, but may have the benefit of reducing the required complexity of the components in the bandwidth sensitive area 9.

The reflections seen from the positive and negative half-cycles at the base XO 2 rate have opposite polarities, and so will cancel through the LPF 201. To account for this, a gate or gate/hold circuit 203 can be used to integrate only the reflections from the positive or negative half-cycles.

In another embodiment, the wheel-profile integration is performed by a passive analog integrating LPF 201. The passive aspect of this filter integrates while eliminating the otherwise high bandwidth requirements of the amplifier 22. The filter should pass the wheel presence information with a similar timing requirement to that of a piezoelectric sensor interface while suppressing higher frequencies such as those of the Base XO 2. A skilled person would know that the LPF of an piezoelectric sensor interface may have a corner frequency of 2 kilohertz.

As shown in FIG. 2, a digital-to-analog converter (DAC) 205 will be used to provide a reference to the amplifier 22 on which the amplified signal will ride. The Logic 28 will control the DAC's 205 output value slowly to remove the aggregate baseline that is tracked over time. Also, in an embodiment of this aspect, the data rate for the Logic 28 will be significantly reduced.

The bandwidth requirements for the amplifier 22 are reduced to only that of the wheel presence information as discussed above regarding the LPF 201. Since the wheel width is small relative to the sensor and lead length, deviations from baseline may be small so that a large gain may be required.

Wheel Count Per Axle without Spatial Profiling

Referring now to FIG. 3, there is shown an embodiment of the invention directed towards determining a wheel count per axle of a vehicle without spatial profiling. In this embodiment, the high bandwidth or spatial-resolution signal is split into two paths. The direct signal and a biased LPF signal are compared at the comparator (CMP) 301, and the high-speed logic 28 counts the rising or falling edges to determine the number of tires seen during a Base XO 2 cycle. This aspect provides a count of tires on the sensor but does not discriminate as to their positions along the sensor, i.e. no spatial profiling.

A tracking LPF 303 is used to smooth the signal as an estimation of the instantaneous baseline. Then, a bias is added to the baseline signal by the SUM 305 to result in a threshold signal, which when over the threshold signal will cause the comparator 301 to trip. The threshold signal comprises the biased LPF signal.

The direct signal and threshold signal outputs are compared at the comparator 301 so that the comparator 301 output activates while the direct signal exceeds the threshold signal. The rising or falling edge of the comparator 301 output will clock a counter in the logic 28 section. The comparator 301 is a high-speed comparator since it is in the bandwidth sensitive area 9.

The counting logic 28 is reset to zero at the start of each measurement period. The difference between the edge-count for the measurement period and a stored count for a period where axles are known to not be present, i.e. the baseline, indicates the number of tires seen.

Spatial Profile of the Wheels on the Sensor

Referring now to FIG. 4, there is shown an embodiment of invention directed towards determining a spatial profile of the wheels of the vehicle on the sensor. This embodiment maps the wheel contact spatial profile using the equivalent time sampling or VCXO/PLL technique as described in FIG. 1*b* and a comparator technique similar to that of the wheel-count solution shown in FIG. 3. In this embodiment, the high-speed ADC 24 shown in FIGS. 1*a* and 1*b* are eliminated. The direct signal from the amplifier 22 and the tracking LPF 303 signal are compared so that the high-speed comparator 301 output activates while the direct signal exceeds the threshold signal. The comparator 301 output, which is binary, is sampled or latched once per VCXO 8 cycle to build a complete profile over multiple Base XO cycles. Each point within the profile is summed with its counterpart from subsequent profiles to build a non-binary profile.

In this embodiment, the gate/hold and sum sections of the circuit have been removed. The sensor 12 may be calibrated at every spatial location measured along the sensor.

This aspect may be combined with the axle detection and weighing aspect shown in FIG. 2 to allow for individual calibration parameters at each spatial location potentially providing higher fidelity weighing capabilities. But, this combined approach may not have the fidelity as the embodiments of the aspect that is shown in FIG. 1*a* or 1*b*, since the weight is aggregated before individual calibration parameters can be applied. However, this combined approach, does provide an opportunity to construct and apply a single calibration parameter that is tailored to the positions and widths of the wheel loads. This combined approach may require making assumptions about the distribution of the load.

In the embodiment shown in FIG. 4, each spatial location has a corresponding up/down counter within the Logic 28. Each counter is reset to zero at the start of the measurement period. The active edge of the VCXO clocks one counter either up or down according to the state of the CMP 301 output. Over multiple measurement periods, points that follow the Tracking LPF 303 output, i.e. no wheel-load, will have a count of roughly zero; while those that deviate, i.e. wheel-loads present, will have a higher value. Instead of simply counting the transitions, this embodiment maps the wheel-sensor contact spatial profile using the VCXO/PLL technique of the embodiment shown in FIG. 1b, and the comparator technique similar to that of the embodiment described in FIG. 3. The comparator 301 output is sampled once per VCXO cycle to build a complete spatial profile of the sensor over multiple base XO cycles, this is an implementation of equivalent time sampling. Each point within the profile is summed with its counterpart from subsequent profiles to build a non-binary profile. Points that follow the Tracking LPF 303 output, i.e. no wheel-load, will have a sum of roughly zero, while those that deviate, i.e. wheel-loads present, will have a larger value. A digital threshold may be set within the Logic 28 to separate loaded from unloaded profile points.

Multiple-Sensor Embodiments of the System and Method

Figure 5A:
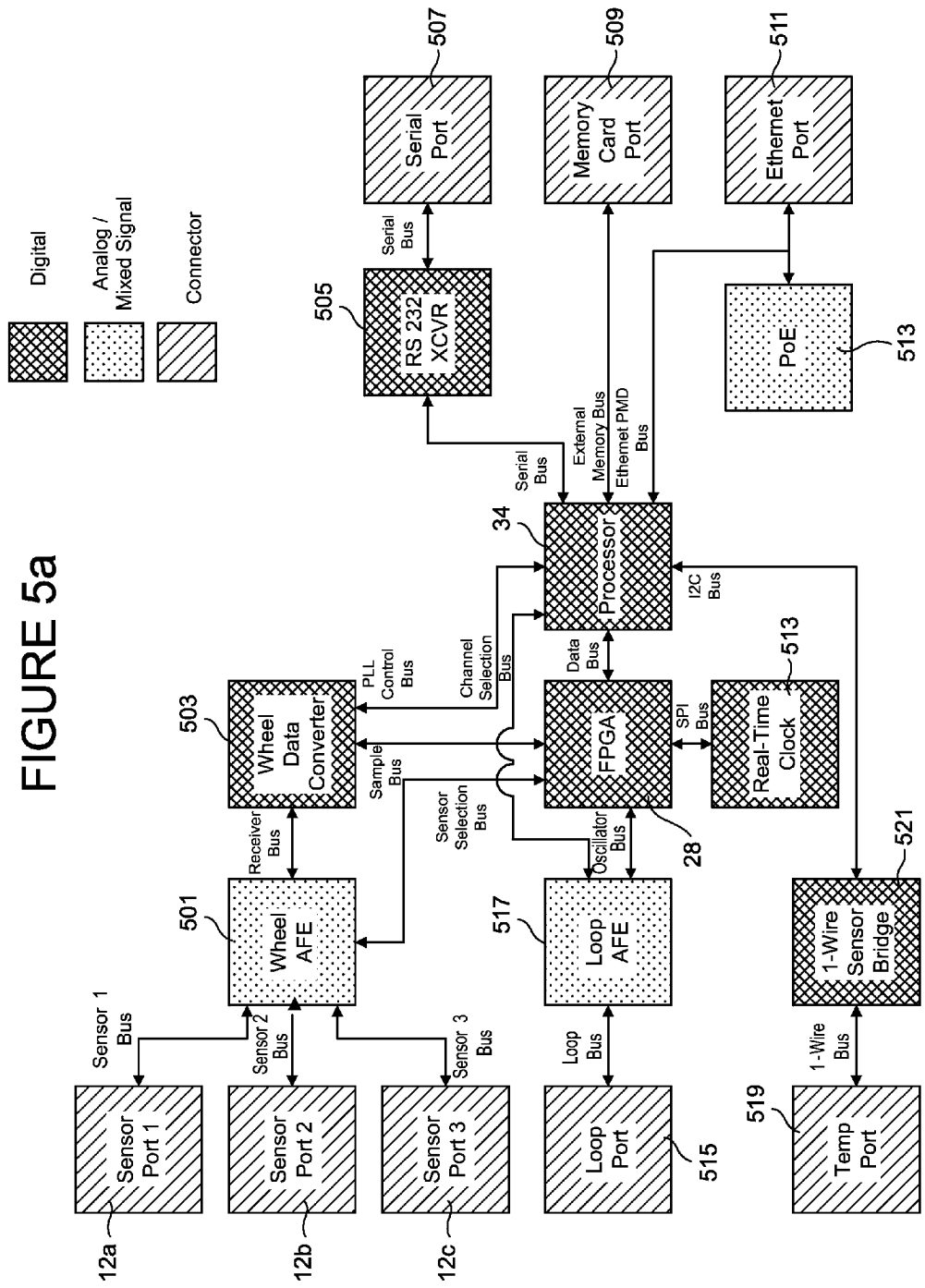
FIG. 5a is a system block diagram of an example embodiment system for measuring vehicle information using a plurality of ETDR sensors, a vehicle presence sensor, and a temperature sensor.

Referring now to FIG. 5a, in an embodiment, there is shown multiple PDS ports 12a, 12b, and 12c. The PDS ports 12a, 12b, and 12c, are connected to the Wheel Analog Front-End (AFE) 501 via corresponding sensor buses. The Wheel AFE is connected to the Wheel Data Converter 503 via the receiver bus, and the Wheel AFE is also connected to the FPGA 28 via the sensor selector bus. The Wheel Data Converter 503 is connected to the FPGA 28 via the sample bus, and the computer 34 via the PLL control bus. A skilled person would understand that various numbers of PDS sensors or PDS sensor ports may be used.

The Loop Port 515 or loop presence detector port is connected to the Loop Analog Front-End (AFE) 517. The Loop AFE is connected to the FPGA 28 via the oscillator bus and the computer 34 via the channel selection bus.

The Temperature Port 519 is connected to the 1-Wire Sensor Bridge 521, which is connected to the computer 34 via the I2C bus.

The FPGA 28 is connected to the computer 34 via the Data Bus, and the Real-Time clock 523 via the serial peripheral interface (SPI) bus.

The computer 34 is connected to a transceiver over a serial bus, such as a RS-232 or RS-422 transceiver (XCVR) 505. The Serial Port 507 is connected to the XCVR 505 via a RS-232 or RS-422 bus. The computer 34 is also connected to the Secure Digital (SD) Card Port via the SD Bus. The computer 34 is also connected to the Ethernet Port 511 and Power Over Ethernet (POE) 513 via the Ethernet PMD Bus.

The Wheel AFE 501, Loop AFE 517, and POE 513 are Analog or Mixed Signal blocks. The FPGA 28, Computer 34, Wheel Data Converter 503, XCVR 505, Real-Time Clock 523, and 1-Wire Sensor Bridge 521 are Digital blocks. The Sensor Ports 12a, 12b, and 12c, Serial Port 507, SD Card Port 509, Loop Port 515, Temperature Port 519, and Ethernet Port 511 are Connectors.

In an embodiment, the Wheel AFE 501 actively pings each of the PDSs attached via the sensors ports 12a, 12b, and 12c in succession by the FPGA 28, which provides a sweep clock and processes the received reflected signal.

Figure 5B:
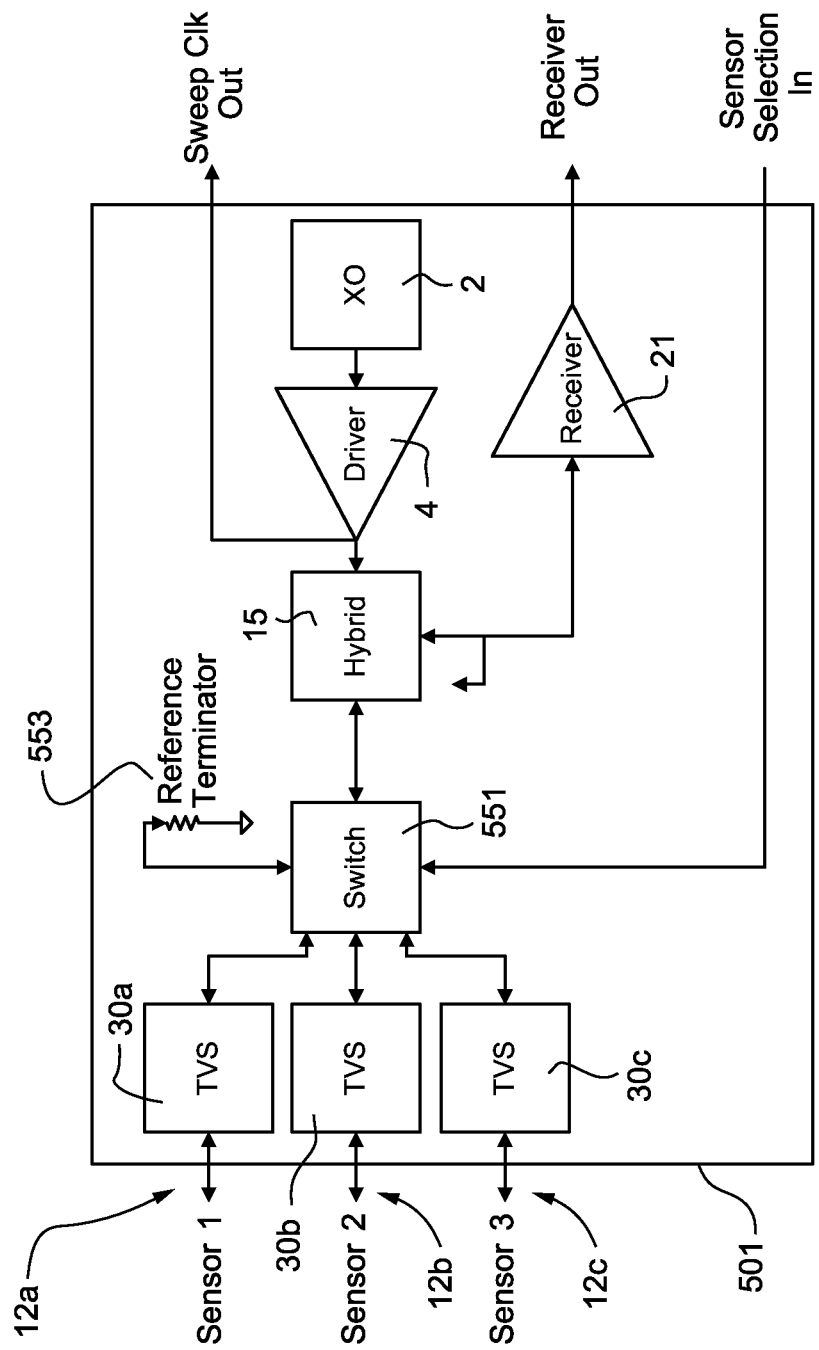
FIG. 5B is a block diagram of an example embodiment of a wheel analog front-end.

Referring to FIG. 5B, in an embodiment of the Wheel AFE 501, three PDS sensors may be connected via Sensor Ports 12a, 12b and 12c to respective TVS protection circuitry 30a, 30b, and 30c. The three PDS sensors or Sensor Ports 12a, 12b, and 12c may be supported by adding a radio-frequency (RF) switch 551. The switch 551 allows for time-division multiplexing between the three sensors and the reference terminator 553. The switch 551 is also connected to the hybrid circuit 15, and a sensor selection input from the sensor selection bus from the FPGA 28. The reference terminator 553 may be used as a referenced to track variation due to pulse amplitude, supply voltage, or ageing, among other parameters.

In another embodiment, the Wheel AFE 501 for interfacing with the 3 sensors or Sensor Ports 12a, 12b, and 12c may be the same as the single sensor implementations shown in FIGS. 1a and 1b with multiple parallel circuit blocks, instead of the switch 551.

The skilled person would understand that in the parallel embodiment, all 3 sensors may be active and sending data, while in the switched version, data is received only when the switch is active for that particular sensor.

Sensor

The sensor or parametric disturbance sensor (PDS) is a transmission line. A number of problems are solved by the system of the invention. These may include longevity, the ability to provide spatial information along the length of the sensor, the ability to provide positional information on wheels along the length of the sensor, the ability to measure wheel pressure, the ability to differentiate individual wheels, the ability to continuously monitor the sensor, ability to resist or detect interference from wheels of an adjacent vehicle during wheel measurement, and ease of installation. This is in part achieved through the design of the sensor.

The design of the sensor takes into account that the bandwidth of a transmission line is reduced the longer the transmission line becomes. Lower bandwidth causes lower minimum feature resolution and more interference between adjacent wheel-loads. Two phenomena cause the reduction in transmission line bandwidth, namely the "skin effect" and dielectric losses.

The skin effect causes conductors to exhibit a frequency dependent resistance, due to the self-inductance of the conductor. This causes the rise-time and dispersion of the transmission line to increase with the square of the transmission line length. This band-limiting has the undesired effect of causing wheels on the sensor to interfere with one another, due to inter-symbol interference. The way to reduce the rise-time without shortening the transmission line length is to reduce the resistance of the transmission line, which is accomplished by using a highly conductive material, and with larger surface area geometries.

Dielectric losses are caused by dissipation in the dielectric material. The amount of dissipation is determined by the loss tangent, and varies by material. This effect causes an increase in the rise-time and dispersion that is proportional to the transmission length. In order to mitigate this problem, a low loss dielectric material must be chosen.

Another problem the sensor solves is the ability to provide an approximately linear response, or characterizable response, to the weight of wheel-loads seen from vehicles such as trucks and cars. The limitations overcome are that the sensor has to provide the linear response with sufficient bandwidth for the system to resolve the desired level of detail.

Problems that the sensor design has overcome are durability and reliability issues that arise when deployed in real world conditions for long periods of time. There is also consideration of manufacturability issues, and road infrastructure impacts. For example, the sensor is deployed in roadways and exposed to all weather conditions. The sensor has to survive and be reliable when it is driven over by vehicles such as cars and trucks continuously over long periods of time. The periods of time may be years or longer.

In one aspect, for example, a commercial requirement is the ability to span one full lane of traffic with a sensor length of 13 feet. Another commercial requirement is the ability to resolve a single tire from a dual tire pair, which has a gap of about 6 inches. This may require a spatial resolution of less than 3 inches which the system is able to provide. A skilled person would understand that the sensor length could be shorter or longer than a typical lane width, while observing any system design constraints.

In an embodiment, the sensor is designed with a 50 ohm nominal characteristic impedance. The range of the change in impedance over the expected wheel-load pressure range is less than 2 ohms. In an embodiment, the system electronics are capable of measuring an impedance change in the range of 45 ohm to 55 ohm, at 50 ohm nominal input impedance.

Figure 6A:
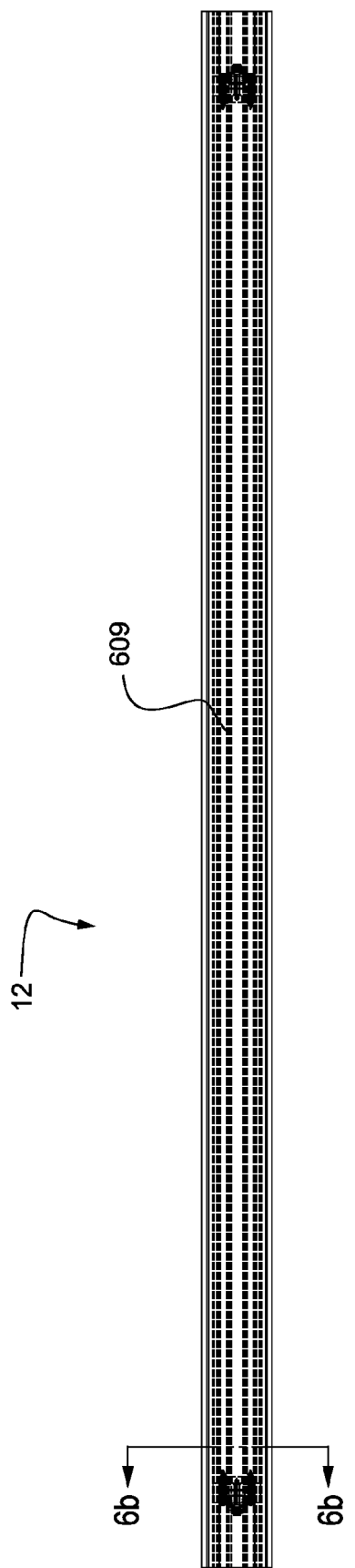
Figure 6B:
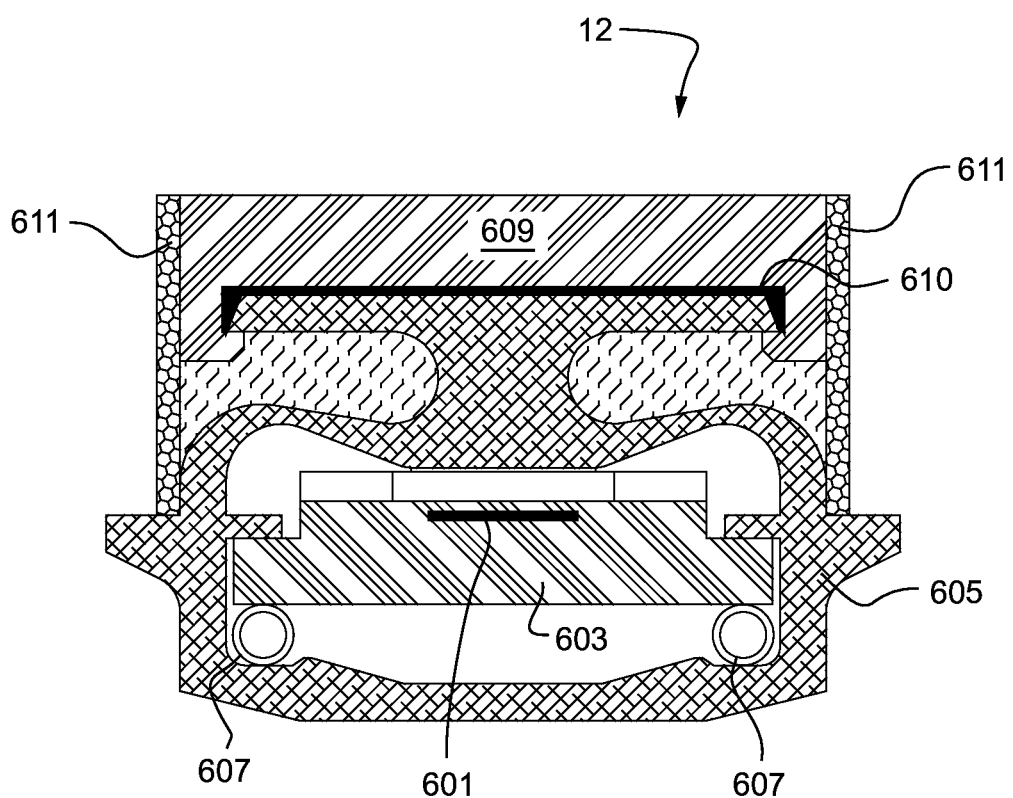

Referring now to FIGS. 6a-6c, there is shown an embodiment of the PDS 12. In the embodiment shown, the overall dimensions are much larger than a typical coaxial cable design, about 1.5 inches high by 2.25 inches wide by about the length of a lane in a road. The main purpose of the larger surface area was to reduce the skin effect issues that would affect the ability to obtain high resolution information. A skilled person would understand that a suitable PDS or transmission line may have variations in the materials chosen for construction, shape, size, and other physical attributes that may be varied to meet the requirements of the overall device, system, method.

In this embodiment, there is shown a PDS 12 or transmission line comprising a sensor core 601 in a sensor carrier 603. The sensor carrier is housed in the sensor carrier extrusion housing 605. The sensor carrier extrusion housing is a metallic shield which surrounds the sensor core 601 and sensor carrier 603. The sensor carrier 603 may be supported or stabilized in the sensor carrier extrusion housing 605 by support tubing 607. The top of the sensor carrier extrusion housing 605 is covered and/or protected by the cap extrusion 609. The cap extrusion is connected to the sensor carrier extrusion housing 605 by adhesive 610. The sensor core 601 may be a half hard copper strip, and the sensor carrier extrusion housing may be made of aluminum. The dielectric is a combination of air and the material of the sensor carrier 603, for example, the sensor carrier 603 may be made of polyethylene. A skilled person would understand that other materials suitable for use in a transmission line may be used, such as aluminum, copper, high density polyethylene, although reliability and durability issues may need to be addressed. The adhesive 610 may be a urethane sealer.

Load from the vehicle's wheels are applied to the cap extrusion 609, which may be mounted flush in the roadway, as a raised surface in the roadway, or above the roadway as required by the aspect or embodiment of the invention. The load is then transferred to the sensor carrier exterior housing 605 via the cap extrusion 609. In an embodiment, the sensor carrier extrusion housing 605 construction material was chosen to be aluminum. Aluminum is a good choice from an electrical signal perspective, other than copper, since sensor carrier extrusion housing would act as the outer conductor of the transmission line sensor, or PDS 12. Aluminum was also chosen for the mechanical properties related to strength and continuous load cycling, since copper does not have the higher strength properties that are required for these purposes.

The top flat portion of the sensor carrier extrusion housing 605 allows the transmission of the wheel load, while retaining multi-tire recognition, e.g. the wheel load from a dual wheel axle. The cap extrusion 609 is designed as a wearing surface in the road that would limit any effects from the gradual wearing away of the surface of the road and sensor carrier extrusion housing 605 without any detrimental measurement impacts. The isolation foam 611 allows the PDS 12 to measure the true force from the wheel by preventing the road encapsulant or grout 705 from bonding to the side surface of the cap extrusion 609 and impacting the amount of deflection seen by the PDS 12.

The PDS 12 is connected to the system or device via a wire assembly or cable that is attached at connector 615. The connector 615 and the rest of the sensor are connected and interface at the termination block 617. The details of the connection and interface are described below.

Figure 7A:
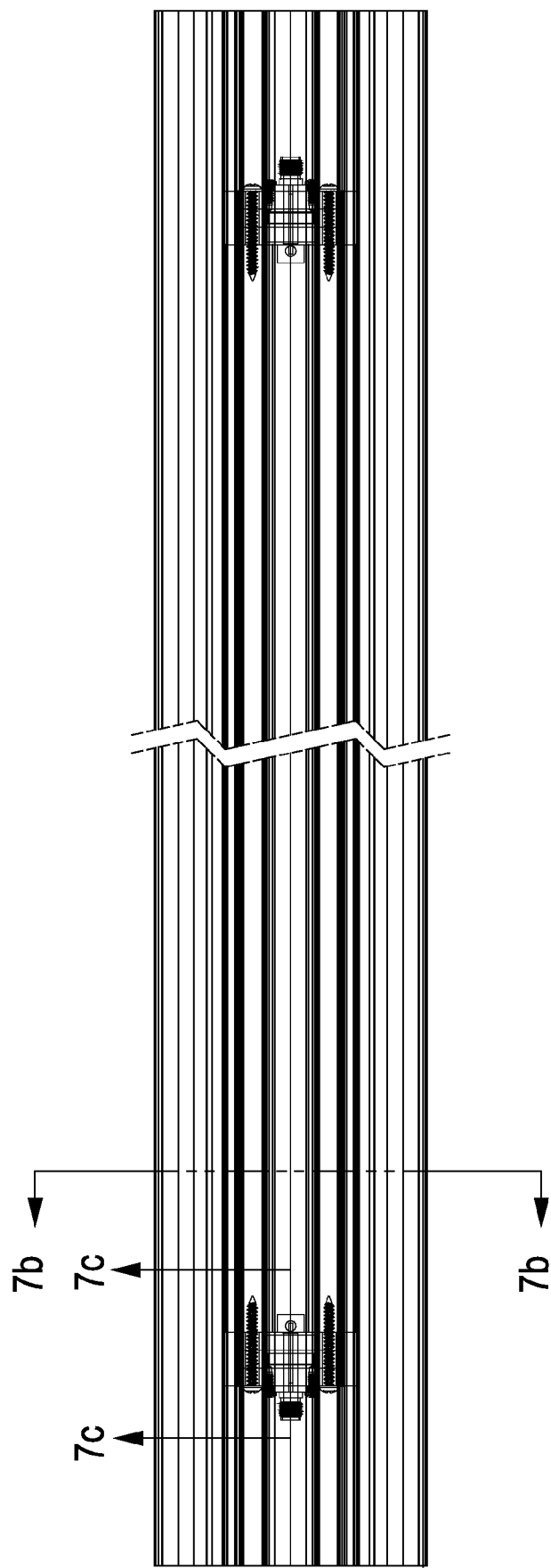
FIGS. 7a-7f are respectively top view, end view, sectional views along the line A-A and B-B, and detail views A and B of an example embodiment of a ETDR sensor.
Figure 7B:
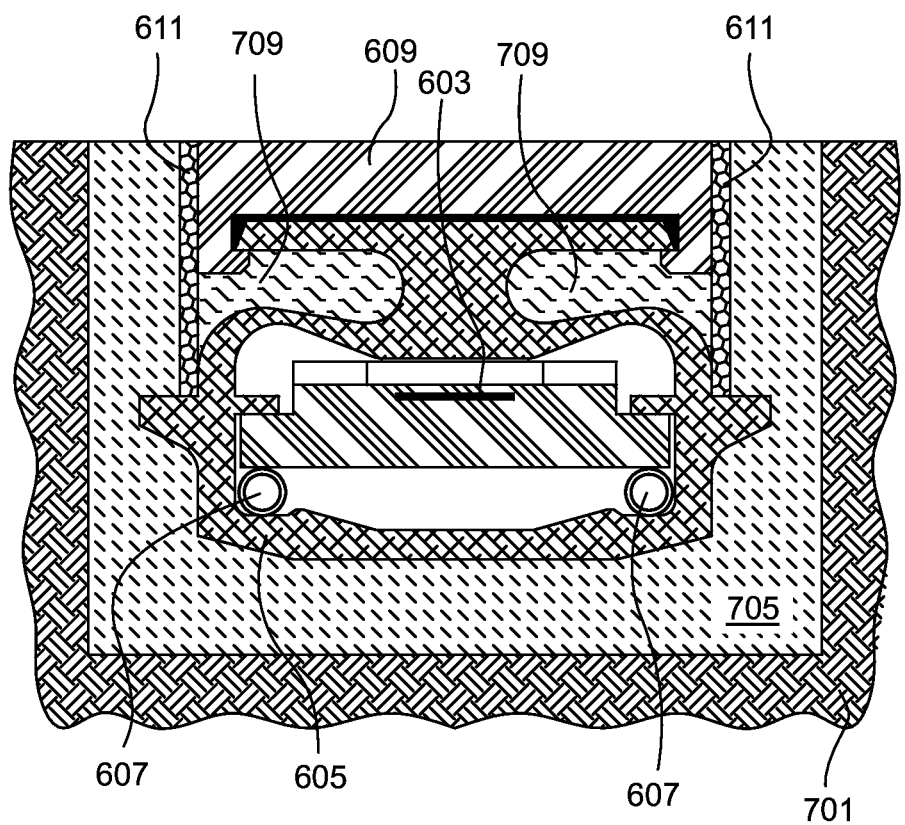
Figure 7C:
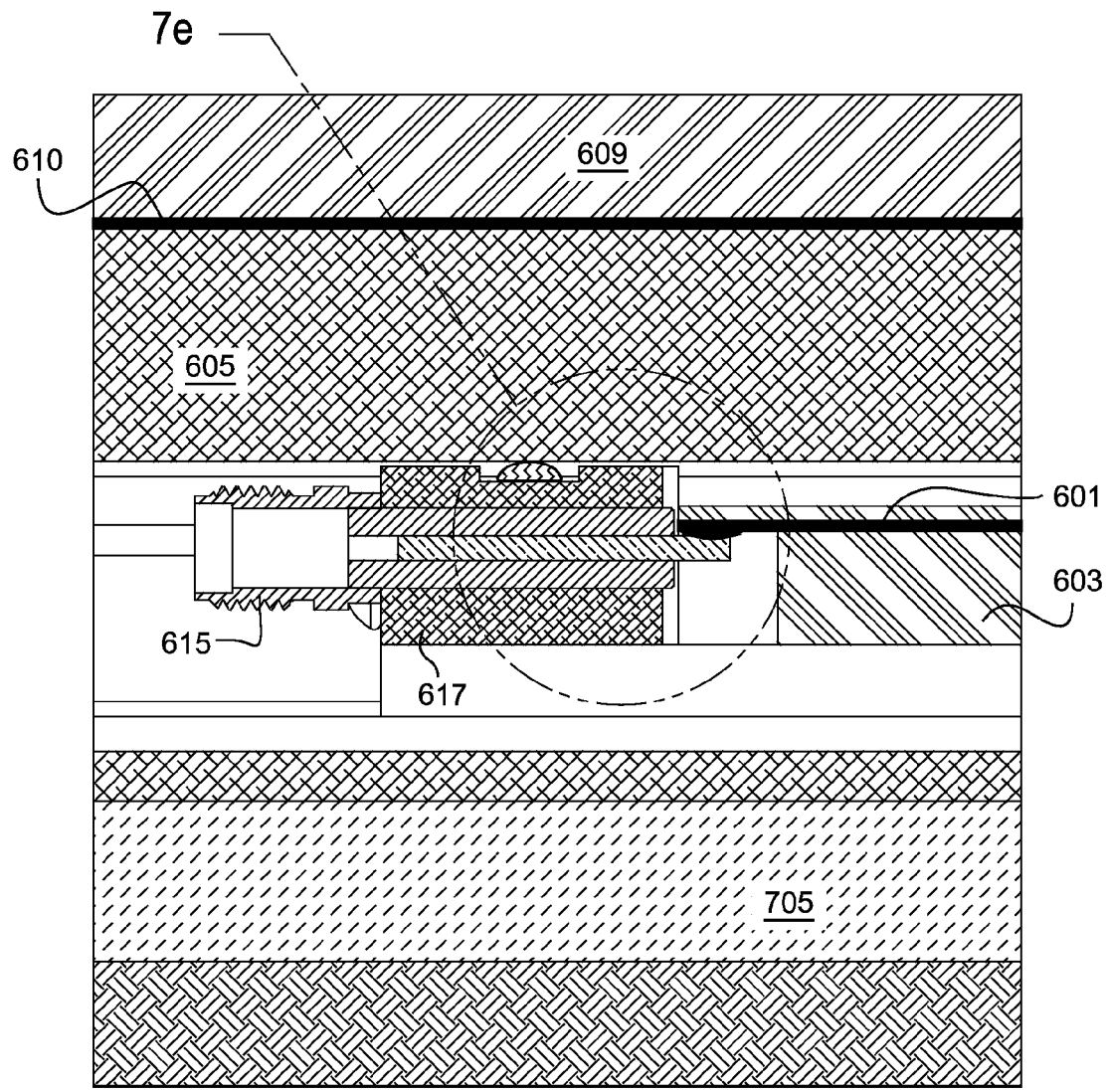
Figure 7D:
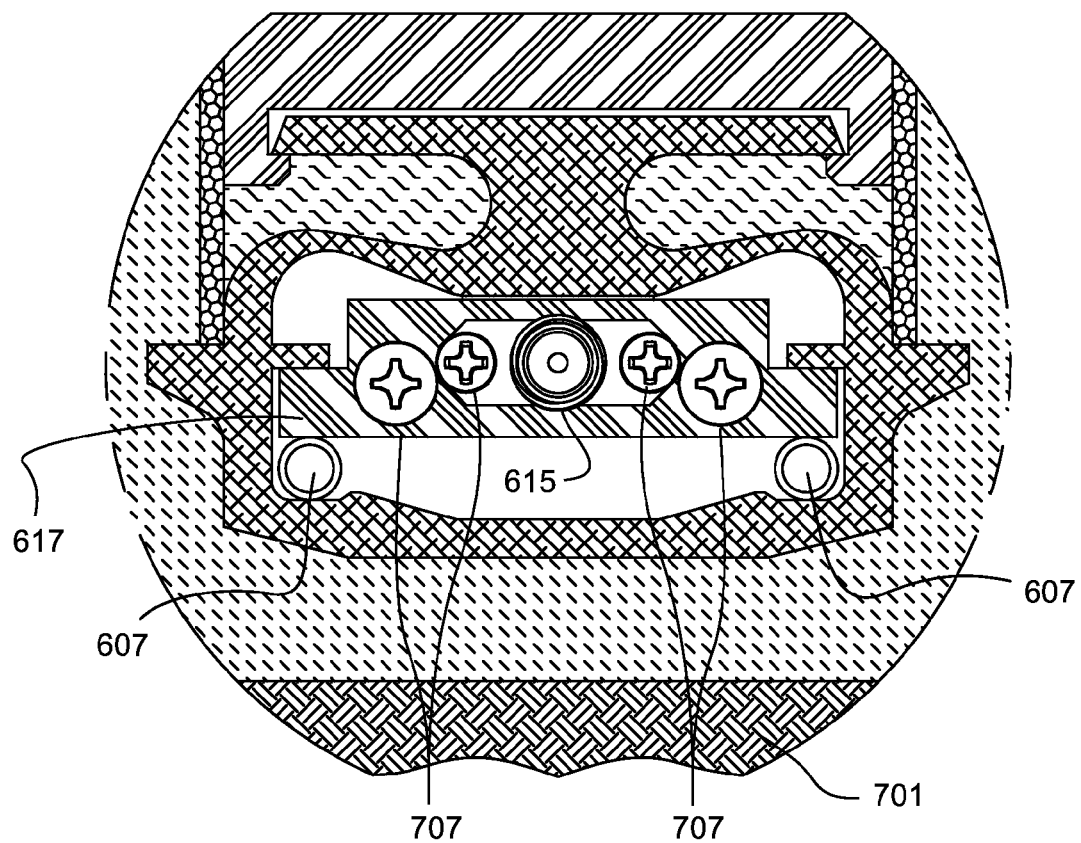
Figure 7E:
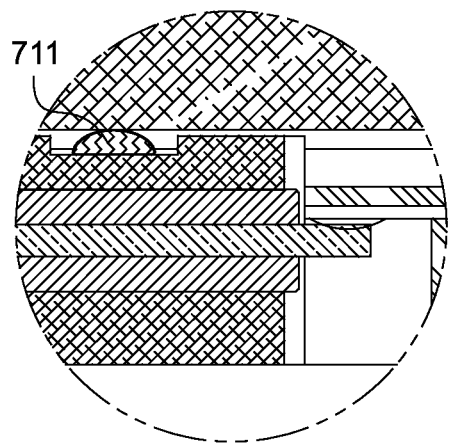
Figure 7F:
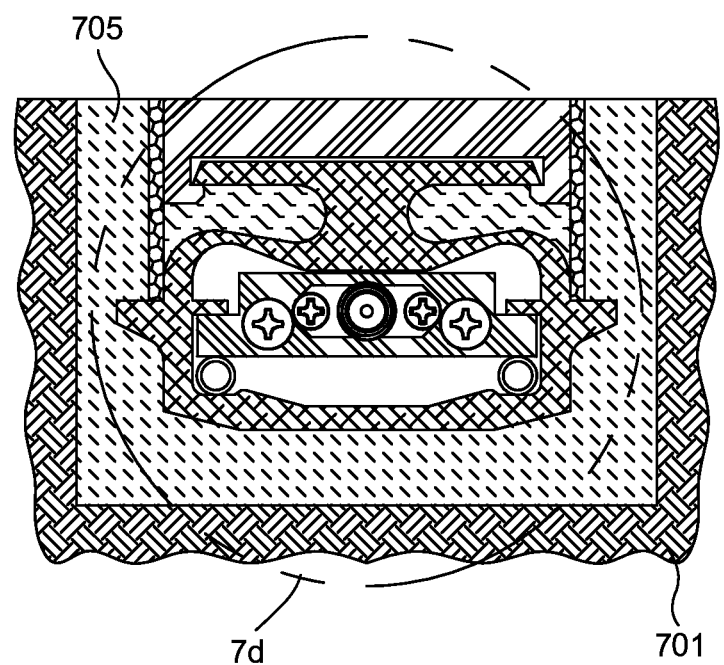

Referring now to FIGS. 7a-7f, there is shown an embodiment of the PDS 12. The end view, FIG. 7f, shows the PDS 12 mounted in a roadway 701, which may be concrete or asphalt, and held in place by grout 705. FIG. 7d shows connector 615 screwed in by screws 707 into the termination block 617 with the termination block screwed into the sensor carrier 603 using screws 707. FIG. 7b shows a section of the PDS 12 as it is mounted in the roadway 701. The closed cell foam 709 runs along the length of the sensor carrier extrusion housing 605. The foam 709 acts as filler to prevent contaminants from entering the gap and causing undesired bridging between the top, flat portion of the extrusion housing and the angled corners below. It is desirable that all the force be transferred through the center column of the extrusion housing.

FIG. 7c shows an embodiment of how the connector 615, termination block 617, and sensor core 601 may be connected. The connector 615 is connected, as understood by a skilled person, to both the sensor core 601 and sensor carrier extrusion housing 605. FIG. 7e shows an electromagnetic interference (EMI) gasket 711 that assists in providing an electrical contact point between the termination block 617 and the sensor carrier extrusion housing 605.

In the embodiment shown, the PDS 12 design addresses the mechanical and electrical requirements of the ETDR device and system. The overall shape and size of the PDS 12 design may be limited by manufacturing constraints, and industry standards or industry expectations regarding acceptable sensor size. A skilled person would understand that these manufacturing and/or industry requirements may change, and that variations in the mechanical and electrical requirements for the PDS are acceptable, as long as they meet the minimum requirements set out by the overall design for the device, system and method.

We claim:
1. A system for measuring moving vehicle information, comprising:
an electrical transmission-line sensor configured to provide an electrical impedance change in response to a wheel-load of a moving vehicle;
an electrical time domain reflectometry signal processing system capable of measuring the electrical impedance change of the electrical transmission-line sensor and converting the electrical impedance change to a signal; and a data-processing system capable of extracting the moving vehicle information of the moving vehicle from the signal.

2. The system of claim 1, wherein the vehicle information comprises a wheel pressure or a wheel-sensor contact dimension or both.

3. The system of claim 2, wherein the wheel-sensor contact dimension comprises at least one of a width of the wheel-sensor contact, a location of the wheel-sensor contact along the sensor, and a wheel-sensor contact duration.

4. The system of claim 1, wherein the moving vehicle information comprises at least one of an axle detection, a vehicle presence detection, a single tire detection, a multi-tire detection, a wheel count, and an axle width.

5. The system of claim 4, wherein: the data processing system is further configured to determine a wheel position or an axle position of the moving vehicle on a vehicular roadway from the location of the wheel-sensor contact along the electrical transmission-line sensor.

6. The system of claim 1, further comprising a speed measuring system for measuring a speed of the vehicle.

7. The system of claim 6, wherein the moving vehicle information further comprises at least one of a wheel-road contact patch length, a weight of the vehicle carried by an individual wheel, a weight of the vehicle, and an inter-axle spacing.

8. The system of claim 6, wherein the data-processing system determines the wheel-road contact patch length from the speed of the vehicle and the wheel-sensor contact duration.

9. The system of claim 6, wherein the data-processing system determines the weight of the vehicle carried by the individual wheel or the weight of the vehicle from the speed of the vehicle, the wheel pressure, the wheel-sensor contact width, and the wheel-sensor contact duration.

10. The system of claim 9, wherein: the data processing system is further configured to determine the weight of the moving vehicle from the weight of the vehicle carried by the individual wheels of the moving vehicle.

11. The system of claim 1 wherein:
the electrical impedance change is caused by a change in the geometry of the electrical transmission-line sensor.

12. An apparatus for measuring information about a moving vehicle comprising:
an electrical time domain reflectometry data processing system for extracting information about the vehicle from a reflected electrical signal; and
an electrical transmission-line sensor configured to provide an electrical impedance change in response to a wheel-load of the moving vehicle.

13. The apparatus of claim 12, further comprising:
a signal source for transmitting an electrical signal along the sensor; and
a receiver for measuring the reflected electrical signal reflected by the electrical transmission-line sensor, the reflected electrical signal being caused by the electrical impedance change of the electrical transmission-line sensor.

14. The apparatus of claim 13, wherein the applied load is one or more wheels of the vehicle.

15. The apparatus of claim 14, wherein the information comprises a wheel pressure or a wheel-sensor contact dimension or both.

16. The apparatus of claim 15, wherein, the wheel-sensor contact dimension comprises at least one of a width of the wheel-sensor contact, a location of the wheel-sensor contact along the electrical transmission-line sensor, and a wheel-sensor contact duration.

17. The apparatus of claim 14, wherein the information comprises at least one of an axle detection, a vehicle presence detection, a single tire detection, a multi-tire detection, a wheel count, and an axle width.

18. The apparatus of claim 14, further comprising a speed measuring system for measuring a speed of the moving vehicle.

19. The apparatus of claim 18, wherein the moving vehicle information further comprises at least one of wheel-road contact patch length, a weight of the vehicle carried by an individual wheel, a weight of the vehicle, and an inter-axle spacing.

20. The apparatus of claim 18, wherein the data-processing system determines the wheel-road contact patch length from the speed of the moving vehicle and the wheel-sensor contact duration.

21. The apparatus of claim 20, wherein the data-processing system determines the weight of the vehicle carried by the individual wheel from the speed of the vehicle, the wheel pressure, the wheel-sensor contact width, and the wheel-sensor contact duration.

22. The apparatus of claim 21, wherein:
the data-processing system is further configured to determine the weight of the moving vehicle from the weight of the moving vehicle carried by the individual wheels of the moving vehicle.

23. The apparatus of claim 21, wherein:
the data processing system is further configured to determine a wheel position or an axle position of the moving vehicle on a vehicular roadway from the location of the wheel-sensor contact along the electrical transmission-line sensor.

24. The apparatus of claim 14, wherein the electrical transmission-line sensor is located within a block of resilient material for placement under a load associated with the moving vehicle.

25. The apparatus of claim 24, wherein the electrical transmission-line sensor is embedded within a road.

26. The apparatus of claim 13, wherein the electrical signal is a pulse or a series of pulses.

27. The apparatus of claim 13, wherein the range of the change in the electrical impedance of the electrical transmission-line sensor is about 2 ohms.

28. The apparatus of claim 12, wherein the electrical transmission-line sensor is a controlled electrical impedance transmission line.

29. The apparatus of claim 28, wherein the electrical transmission-line sensor is one of a coaxial cable, a twin-axial cable, a stripline circuit, or a microstrip circuit.

30. The apparatus of claim 12 wherein: the electrical impedance change is caused by a change in a geometry of the electrical transmission-line sensor.

31. A method for measuring moving vehicle information, comprising:
measuring a change in the electrical impedance of an electrical transmission-line sensor as the electrical transmission-line sensor is loaded by a moving vehicle, using electrical time domain reflectometry signal processing.

32. The method of claim 31, further comprising:
converting the electrical impedance change to a signal; and
extracting the moving vehicle information from the signal by processing the signal.

33. The method of claim 32, wherein the change in the electrical impedance of the electrical transmission-line sensor is caused by one or more wheels of the vehicle.

34. The method of claim 33, wherein the vehicle information comprises a wheel pressure or a wheel-sensor contact dimension or both.

35. The method of claim 34, wherein the wheel-sensor contact dimension comprises at least one of a width of the wheel-sensor contact, a location of the wheel-sensor contact along the electrical transmission-line sensor, and a wheel-sensor contact duration.

36. The method of claim 33, wherein the vehicle information comprises at least one of an axle detection, a vehicle presence detection, a single tire detection, a multi-tire detection, a wheel count, and an axle width.

37. The method of claim 33, further comprising measuring a speed of the moving vehicle.

38. The method of claim 37, wherein the moving vehicle information further comprises at least one of wheel-road contact patch length, a weight of the vehicle carried by an individual wheel, a weight of the moving vehicle, and an axle width.

39. The method of claim 37, wherein the data-processing system determines the wheel-road contact patch length from the speed of the moving vehicle and the wheel-sensor contact duration.

40. The method of claim 37, wherein the data-processing system determines the weight of the vehicle carried by the individual wheel from the speed of the moving vehicle, the wheel pressure, the wheel-sensor contact width, and the wheel-sensor contact duration.

41. The method of claim 40, wherein the data processing system is configured to determine a weight of the moving vehicle from the weight carried by the individual wheels of the moving vehicle.

42. The method of claim 32, wherein:
the change in the electrical impedance is caused by a change in a geometry of the electrical transmission-line sensor.

* * * * *